(12) United States Patent
Yamamoto et al.

(10) Patent No.: US 6,393,151 B1
(45) Date of Patent: May 21, 2002

(54) PATTERN READING SYSTEM

(75) Inventors: Kazuhiko Yamamoto, Ibaragi-ken; Shunji Mori, Kashiwa; Teruo Tsuchiya; Seiichi Saito, both of Tokyo; Keiichi Anahara, Tokorozawa, all of (JP)

(73) Assignees: Agency of Industrial Science and Technology, Tokyo (JP); Tokyo Keiki Company Limited, Ota-ku (JP)

(*) Notice: Subject to any disclaimer, the term of this patent is extended or adjusted under 35 U.S.C. 154(b) by 0 days.

(21) Appl. No.: 08/452,500

(22) Filed: May 30, 1995

Related U.S. Application Data

(63) Continuation of application No. 08/305,811, filed on Sep. 14, 1994, now abandoned, which is a continuation of application No. 08/058,798, filed on May 10, 1993, now abandoned, which is a continuation of application No. 07/832,624, filed on Feb. 12, 1992, now abandoned, which is a continuation of application No. 07/616,824, filed on Nov. 19, 1990, now abandoned, which is a continuation of application No. 07/501,411, filed on Mar. 22, 1990, now abandoned, which is a continuation of application No. 07/270,191, filed on Nov. 14, 1988, now abandoned, which is a continuation of application No. 07/006,360, filed on Jan. 14, 1987, now abandoned, which is a continuation of application No. 06/815,190, filed on Dec. 26, 1985, now abandoned, which is a continuation of application No. 06/735,719, filed on May 20, 1985, now abandoned, which is a continuation of application No. 06/330,552, filed on Dec. 14, 1981, now abandoned, which is a continuation-in-part of application No. 06/084,168, filed on Oct. 12, 1979, now abandoned.

(30) Foreign Application Priority Data

Oct. 13, 1978 (JP) .......................................... 78/125055

(51) Int. Cl.⁷ ............................................... G06K 9/48

(52) U.S. Cl. ........................ 382/200; 382/198; 382/201; 382/203

(58) Field of Search ................................. 382/197, 198, 382/199, 200, 316, 201, 203, 204, 242; 395/141, 142, 150, 167, 168, 169

(56) References Cited

U.S. PATENT DOCUMENTS

| | | | |
|---|---|---|---|
| 3,766,520 A | * 10/1973 | Patterson | 382/21 |
| 3,925,760 A | 12/1975 | Mason et al. | 340/146.3 AE |
| 4,087,788 A | 5/1978 | Johannesson | 340/146.3 AE |
| 4,097,847 A | 6/1978 | Forsen et al. | 340/146.3 AE |
| 4,566,124 A | * 1/1986 | Yamamoto et al. | 382/21 |

* cited by examiner

Primary Examiner—Phuoc Tran
(74) Attorney, Agent, or Firm—Oblon, Spivak, McClelland, Maier & Neustadt, P.C.

(57) ABSTRACT

An apparatus for recognizing visual patterns of handprinted characters or the like by means of an optical character reader which reads the patterns by a so-called outermost point method. While tracing the contour of the pattern stored in a two-dimensional memory, the distances from the starting point of the tracing and the integrated values of the coordinates of the points traced on the contour from the starting points are simultaneously obtained successively to extract outermost points for the series of contours. According to this outermost points, the contours are segmented into the convex line segments, concavity line segments and hole segments and the corresponding parameters of features of each segment are detected. Simultaneously, the convex line segment of which is shorter than a predetermined length is rejected and the remaining segments are subjected to matching operation in accordance with preliminarily prepared dictionary, thereby making a decision as to the pattern's identity.

1 Claim, 25 Drawing Sheets

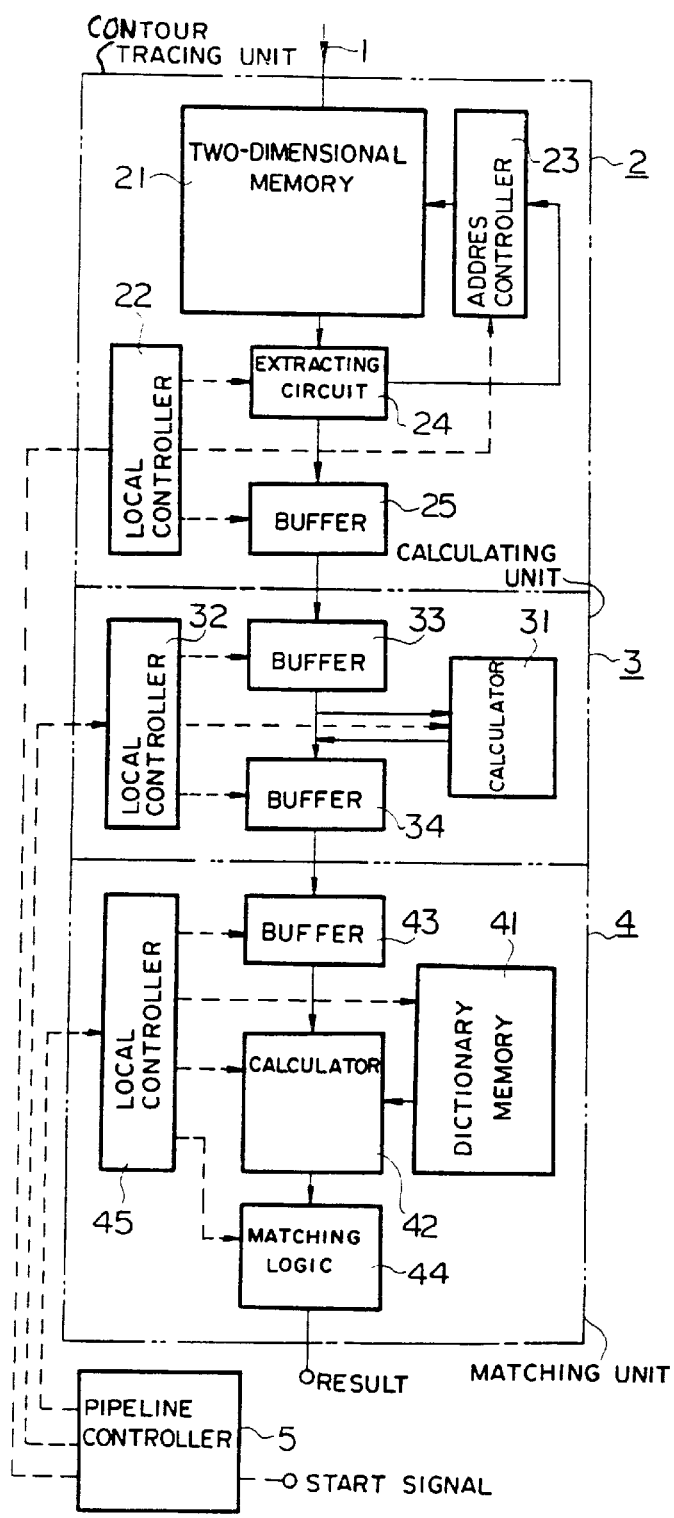
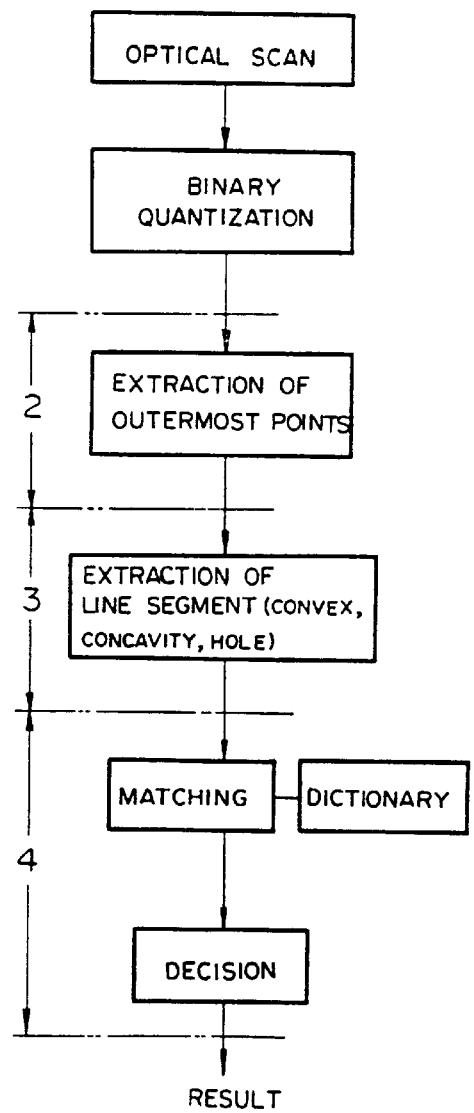

FIG. 3

| r  | PX(r) | PY(r) | PL(r) | GX(r) | GY(r) |
|----|-------|-------|-------|-------|-------|
| 1  | 43    | 18    | 72    | 2140  | 2140  |
| 2  | 42    | 18    | 72    | 2140  | 2140  |
| 3  | 40    | 16    | 75    | 2187  | 2187  |
| 4  | 40    | 16    | 75    | 2187  | 2187  |
| 5  | 36    | 15    | 79    | 2256  | 2256  |
| 6  | 18    | 17    | 98    | 2721  | 2721  |
| 7  | 18    | 17    | 98    | 2721  | 2721  |
| 8  | 17    | 18    | 1     | 24    | 26    |
| 9  | 17    | 19    | 2     | 41    | 45    |
| 10 | 25    | 43    | 36    | 879   | 1012  |
| 11 | 26    | 44    | 37    | 916   | 1074  |
| 12 | 26    | 44    | 37    | 916   | 1074  |
| 13 | 27    | 44    | 38    | 943   | 1118  |
| 14 | 27    | 44    | 38    | 943   | 1118  |
| 15 | 29    | 42    | 41    | 1024  | 1238  |
| 16 | 42    | 20    | 70    | 2016  | 2103  |

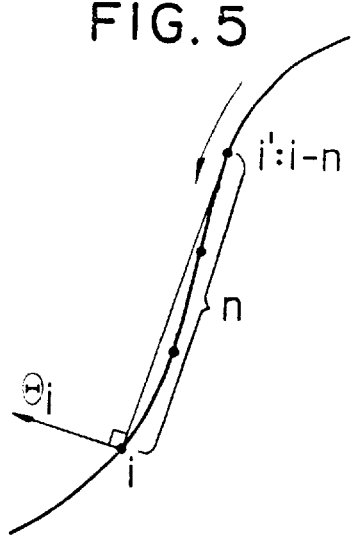
FIG. 5
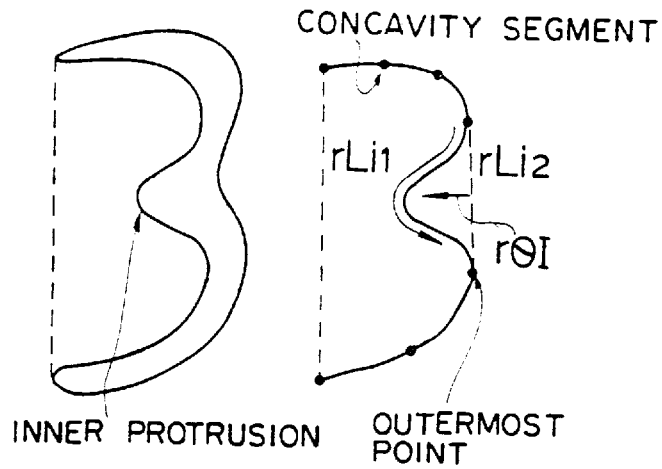
FIG. 8a  FIG. 8b
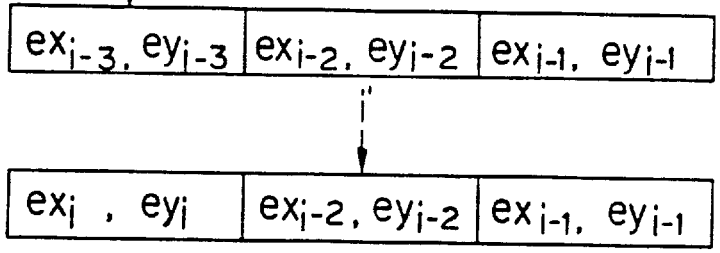
FIG. 6
FIG. 7
| 3 | 2 | 1 | 16 | 15 |
|---|---|---|----|----|
| 4 | 3 | 1 | 15 | 14 |
| 5 | 5 | 5 | 13 | 13 |
| 6 | 7 | 9 | 11 | 12 |
| 7 | 8 | 9 | 10 | 11 |
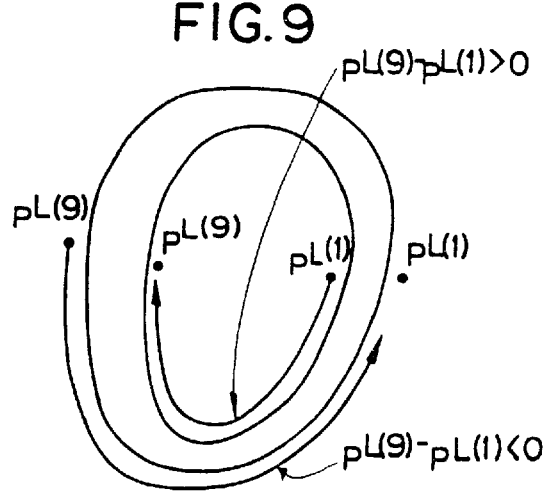
FIG. 9

FIG.11

|     | C | X  | Y  | L₁ | L₂ | θ  | σ  | H(16) | | | | | | | | | | | | | | | |
|-----|---|----|----|----|----|----|----|---|---|---|---|---|---|---|---|---|---|---|---|---|---|---|---|
| (1) | 0 | -5 | 4  | 34 | 25 | 54 | -3 | 0 | 0 | 0 | 0 | 0 | 0 | 17 | 51 | 42 | 11 | 0 | 25 | 0 | 0 | 0 | 0 |
| (2) | 1 | -2 | 18 | 5  | 4  | 73 | 0  | 0 | 0 | 0 | 0 | 0 | 0 | 0  | 0  | 0  | 0  | 0 | 0  | 0 | 5 | 5 | 0 |
| (3) | 0 | 5  | 4  | 30 | 25 | 83 | -2 | 9 | 0 | 0 | 0 | 0 | 56 | 0 | 0 | 0 | 2 | 2 | 0 | 5 | 22 | 36 | 48 |
| (4) | -1 | 0 | -9 | 31 | 25 | 29 | 3 | 9 | 0 | 0 | 0 | 0 | 14 | 5 | 0 | 0 | 2 | 0 | 0 | 0 | 0 | 0 | 5 |
| (5) | 2 | 4  | -4 | -4 | 10 | 0  | 0  | 12 | 12 | 12 | 12 | 12 | 25 | 12 | 12 | 2 | 12 | 25 | 12 | 12 | 0 | 12 |

FIG.14

|     | C | X | Y | L₁ | L₂ | θ | σ | LI₁₂ | θI | H(16) | | | | | | | | | | | | | | |
|-----|---|---|---|----|----|---|---|------|----|---|---|---|---|---|---|---|---|---|---|---|---|---|---|---|
| (1) max | 0 | -4 | 8 | 86 | 53 | 57 | -3 | -1 | -1 | 0 | 0 | 0 | 0 | 0 | 0 | 9 | 17 | 35 | 70 | 63 | 30 | 31 | 0 | 0 |
|     min | 0 | -10 | 3 | 42 | 30 | 50 | -14 | -1 | -1 | 0 | 0 | 0 | 0 | 0 | 0 | 0 | 0 | 3 | 28 | 22 | 2 | 0 | 10 | 0 |
| (2) | 1 | 3 | 38 | 20 | 16 | 79 | 1 | -1 | -1 | 2 | 4 | 0 | 0 | 0 | 0 | 0 | 0 | 0 | 0 | 0 | 5 | 0 | 14 | 0 |
|     | 1 | -11 | 22 | 4 | 3 | 66 | 0 | 0 | 0 | 0 | 0 | 0 | 0 | 0 | 0 | 0 | 0 | 0 | 0 | 0 | 0 | 0 | 0 | 0 |
| (3) | 0 | 10 | 13 | 66 | 59 | 87 | -1 | -1 | -1 | 50 | 10 | 15 | 65 | 69 | 39 | 9 | 0 | 0 | 6 | 0 | 3 | 5 | 0 | 0 |
|     | 0 | 3 | 1 | 29 | 25 | 80 | -5 | 0 | 0 | 3 | -1 | 1 | 26 | 45 | 5 | 2 | 0 | 0 | 0 | 0 | 0 | 0 | 0 | 0 |
| (4) | -1 | 3 | -10 | 71 | 49 | 33 | 11 | 1 | 1 | 18 | 10 | 52 | 28 | 75 | 75 | 92 | 6 | 6 | 25 | 0 | 36 | 78 | 13 | 57 |
|     | -1 | -4 | -18 | 34 | 29 | 25 | 2 | 0 | 0 | 0 | -1 | 0 | 0 | 0 | 0 | 2 | 0 | 0 | 0 | 0 | 0 | 17 | 0 | 0 |
| (5) | 2 | 8 | -3 | 64 | -1 | -1 | -1 | 0 | 0 | 79 | 62 | 0 | 0 | 0 | 0 | 0 | 12 | 12 | 0 | 0 | 25 | 98 | 46 | 0 |
|     | 2 | 1 | -10 | 5 | 0 | 0 | 0 | 0 | 0 | 0 | 0 | 0 | 0 | 0 | 0 | 0 | 12 | 0 | 0 | 12 | 0 | 0 | 0 | 0 |

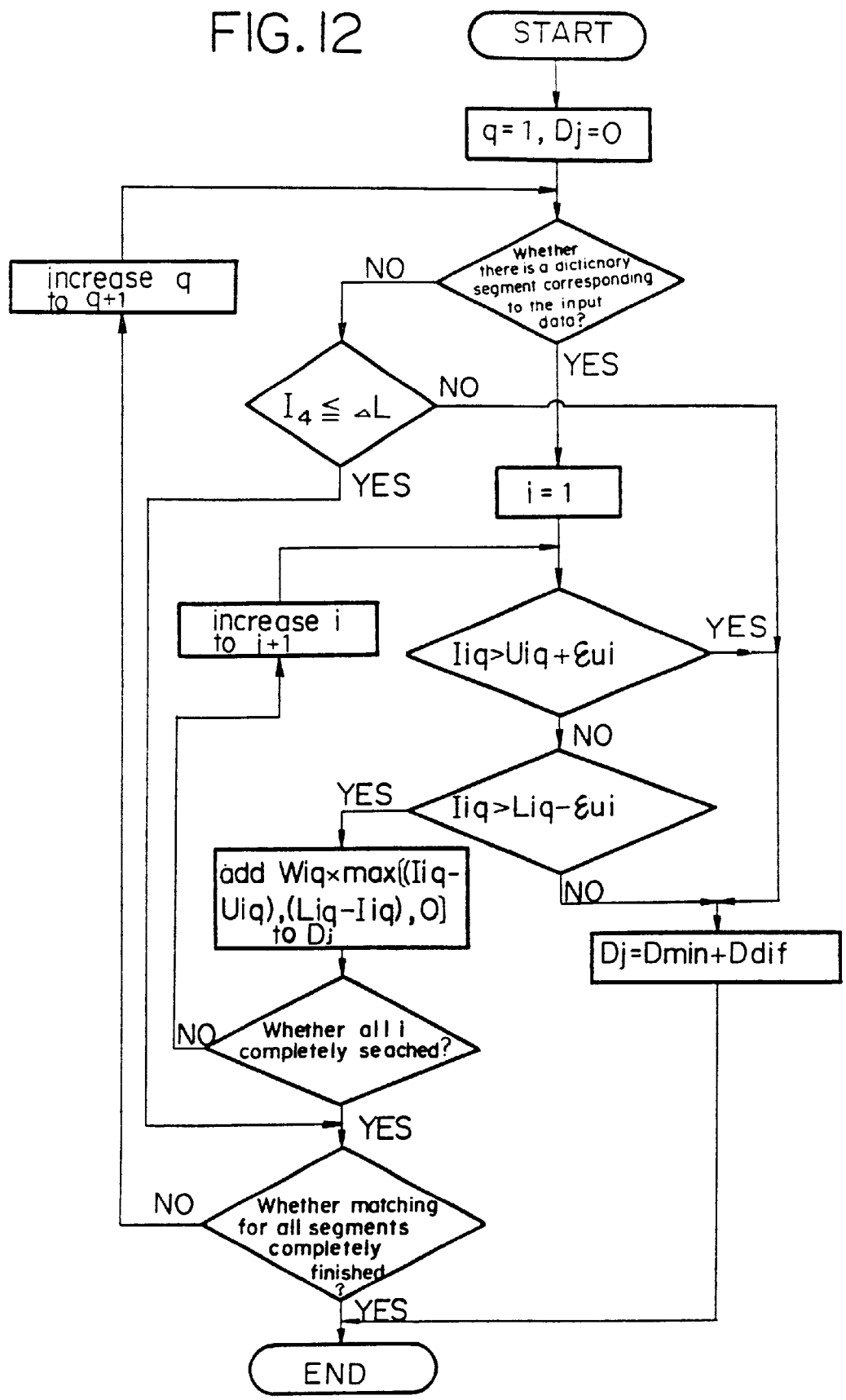

TRACING DIRECTION
START POINT

START POINT
TRACING DIRECTION (0,79)          (63,79)

(0,0)     x     (63,0)

| ADR | 1 BIT | |
|---|---|---|
| 0 | (0,0) | DATA |
| 1 | (1,0) | DATA |
| 2 | (2,0) | DATA |
| 3 | (3,0) | DATA |
| 4 | (4,0) | DATA |
| ... | ... | |
| 5118 | (62,79) | DATA |
| 5119 | (63,79) | DATA |

FIG. 28a

| First detected data<br>CONCAVE |
|---|
| Second detected data<br>CONVEX |
| Third detected data<br>CONCAVE |
| Fourth detected data<br>CONVEX |
| ⋮ |
| (K-1)th detected data<br>CONCAVE |
| Kth detected data<br>CONVEX |

CONTENTS of
INPUT BUFFER(A)

FIG. 28b

| Third detected data<br>CONCAVE |
|---|
| Fourth detected data<br>CONVEX |
| Fifth detected data<br>CONCAVE |
| Sixth detected data<br>CONVEX |
| ⋮ |
| Kth detected data<br>CONVEX |
| First detected data<br>CONCAVE |
| Second detected data<br>CONVEX |

CONTENTS of
INPUT BUFFER(B)

PATTERN READING SYSTEM

CROSS REFERENCE TO RELATED APPLICATIONS

This application ia a continuation of Ser. No. 08/305,811, filed Aug. 14, 1994, now abandoned, which is a continuation of Ser. No. 08/058,798, filed May 10, 1993, now abandoned which is a continuation of application Ser. No. 07/832,624, filed Feb. 12, 1992, now abandoned, which is continuation of application Ser. No. 07/616,824, filed Nov. 19, 1990, now abandoned , which is a continuation of application Ser. No. 07/501,411, filed Mar. 22, 1990, now abandoned, which is a continuation of application Ser. No. 07/270,191, filed Nov. 14, 1988, now abandoned, which is a continuation of application Ser. No. 07/006,360, filed Jan. 14, 1987, now abandoned, which is a continuation of application Ser. No. 06/815,190, filed Dec. 26, 1985, now abandoned, which is a continuation of application Ser. No. 06/735,719, filed May 20, 1985, now abandoned, which is a continuation of application Ser. No. 06/330,552, filed Dec. 14, 1981, now abandoned, which is a continuation of application Ser. No. 06/084,168, filed Oct. 12, 1979 now abandoned.

BACKGROUND OF THE INVENTION

1. Field of the Invention

This invention relates to a pattern reading system adapted for the recognition of characters, particularly handprinted characters.

2. Description of the Prior Art

In the past, as systems for recognizing hand-printed characters have had no accepted standard forms, the structural analysis approach has been used most widely. In this approach, the local characteristic properties of the visual patterns of characters to be recognized are extracted, each of the characters is represented by a construction composed of the extracted features, and the construction is recognized. The known methods may be broadly divided into two types as follows:

a) Methods based on the recognition that each character is made up of lines and the character is recognized on the basis of these line elements.

b) Methods in which each character made up of the black portion is recognized by extracting the geometric features of the character including the white background portion.

Methods of type a) usually require a preliminary processing or thinning procedure whereby the line segments of the resulting thin character are extracted and approximated with straight lines. These methods have the disadvantages of confusing the features of a character due to the occurrence of "whiskers" and the loss of the delicate shapes of the character caused by the thinning operation. Another disadvantage is the fact that the approximation of curves with broken lines tends to complicate the representation of the curves. These disadvantages impose some limitations on the methods of the above a).

In contrast, the methods of type b) are effective in that the features of a character including the white background portion can be extracted without any thinning operation and the concavity and convexity of the line segments of the character are extracted only by following the contours.

Many different techniques have-been developed for performing these methods but these techniques have been disadvantageous from the hardware point of view. For example, in the case of the method in which the concave and convex segments of a character are extracted by a two-dimensional processor in accordance with a two-dimensional parallel processing, the construction of the required apparatus will inevitably be extremely complicated and the cost will also be large. In the case of the other method, which is designed to overcome these deficiencies and in which a specially designed one-dimensional processor is used to process data line by line, there is a disadvantage that, since the method is based on line parallel processing, it is necessary to use a special processor for speeding up the processing. Moreover, a character consisting of discrete line segments cannot be positively recognized unless sufficient continuity of the respective points is maintained, thus inevitably complicating the apparatus.

To avoid these shortcomings, character recognition systems capable of highly accurate character recognition, and having a number of advantages from the hardware point of view, have been developed, in which the contour of a character is traced to extract the individual concave and convex line segments on the contour. This tracing procedure has the advantage of a reduced number of calculation points, because the number of points on a contour is far fewer than the number of points in the entire, 2-dimensional memory. For example, the ratio of the number $n_a$ of intersections on the entire two-dimensional memory to the number $n_b$ of the points on the contour of a character would typically be on the order of 20. Therefore, the number of calculation points to be processed would be reduced to about one twentieth by using the contour technique. Other advantages are that no preliminary processing is required for extracting the connected components and the sequence of all the calculation points, or their connections forming the line segments, is defined, making it easier to determine the correspondence of the extracted features for a matching operation with a dictionary.

However, this tracing system has the disadvantage of being unsuited for use with two-dimensional parallel processing. Also, the concavity and convexity structure extraction systems known to date, which employ this tracing technique, are disadvantageous in that the recognition, though exact, inevitably tends to become microscopic; while there will be no problem in the case of a character with a smooth boundary surface, the presence of a large number of small concave and convex segments on the contour can cause a convex line segment to be mistaken for a concave line segment and so on.

SUMMARY OF THE INVENTION

With the purpose of overcoming the foregoing deficiencies in the prior art, it is a main object of the present invention to provide a pattern reading system in which, without being affected by the local variations, particularly the small concave and convex segments on the contour of a character pattern, the contour is segmented on the basis of a global feature extraction and then the detailed parameters of feature are extracted so as to perform the pattern reading.

It is another object of the invention to provide a pattern reading system in which the preparation of a dictionary for effecting the reading is accomplished in such a manner that the short convex line segments are rejected and the arrangement of the line segments is controlled for a matching operation, thereby making the dictionary compact without any deterioration in the pattern recognition performance.

In accordance with the pattern reading system of this invention, a two-dimensional memory stores a two-dimensional character pattern of a character which was scanned by an optical scanner and the stored content is recognized with a high efficiency by a recognition system based on the "outermost point method." More specifically, while tracing the contour of the two-dimensional character pattern on the two-dimensional memory, the distances of the traced points on the contour from the starting point of the tracing are obtained and simultaneously the integrated values of the coordinates of the traced points on the contour from the starting point are calculated so as to extract them as outermost points for the series of contours. Then, in accordance with the outermost points, the character contours are segmented into the convex line segments, concave line segments and hole segments and then the parameters of feature are detected for each of the segments. Convex line segments which are shorter than a predetermined length are rejected and the remaining segments are subjected to a matching operation with the preliminarily prepared dictionary, thereby recognizing the two-dimensional pattern.

In extracting the parameters of the geometrical features of the segments, henceforth referred to as the "feature parameters" of the segments, the feature parameters of the first concave line segment detected, and the feature parameters of the other segments, are grouped in the order of detection as the first-category features. Also the feature parameters of segments ranging from the second concave line segment in said group up to the segment next to the first concavity line segment are sequentially grouped as the second-category features, thereby providing an alternative, ordered group with a different starting angle. When there is a specific designation in the dictionary, a match is attempted between the two sets of the feature parameters and the dictionary, thereby accomplishing the two-dimensional pattern recognition.

In accordance with the invention, the recognition of patterns with a high degree of accuracy can still be ensured even if the memory capacity of the dictionary is reduced and there is no need to use an additional dictionary for considerably distorted forms of the input character. Moreover, a decision can be automatically made regarding the identity of the input character by means of the feature parameters representing the partial patterns, without using any specially designed processor, and the character-at-a-time processing ensures an effective recognition of a visual pattern which is in the form of a discrete pattern. Further, there is no need to increase the memory capacity, and even characters which are deformed more or less can be read effectively, thus making it possible to realize a pattern recognition apparatus which is well suited for automatic reading of handprinted characters.

The invention will be described in greater detail with reference to the accompanying drawings.

BRIEF DESCRIPTION OF THE DRAWINGS

FIG. 1a is a block diagram showing a hardware system which is useful for explaining the principle of the invention.

FIG. 1b is a flowchart diagram useful for explaining the operation of the hardware system shown in FIG. 1a.

FIG. 3 is a diagram showing an outermost point list by way of example.

FIG. 5 is a diagram showing the relation between the contour and the direction $\theta_i$ of the line element at a traced point on the contour.

FIG. 6 shows a diagram showing the contents of a coordinate memory and the positions of a pointer i' with the memory length n=3.

FIG. 7 is a diagram showing an angle conversion matrix and its contents.

FIG. 8a is a diagram showing by way of example a character having an inner protrusion.

FIG. 8b is a diagram showing the concave line segment corresponding to the character of FIG. 8a as well as the features $rL_{i1}$ and $rL_{i2}$ representing the position of the inner outermost point and the inner structure and the direction r$\theta$I of the inner protrusion.

FIG. 9 is a diagram showing that, where the same tracing condition is used, the outer contour will be traced counter-clockwise and the hole contour will be traced clockwise, making the signs of the respective values of pL(9)–pL(1) opposite to each other.

FIG. 11 is a diagram showing the detected feature parameters for the diagram of FIG. 10.

FIG. 12 is a flowchart diagram for a separate matching procedure.

FIG. 14 is a diagram showing by way of example the form and contents of a mask in a category feature of the dictionary.

FIGS. 28a and 28b illustrate the arrangement of data in the input buffers of the matching unit 4.

DETAILED DESCRIPTION OF THE PREFERRED EMBODIMENTS

Figure 2:
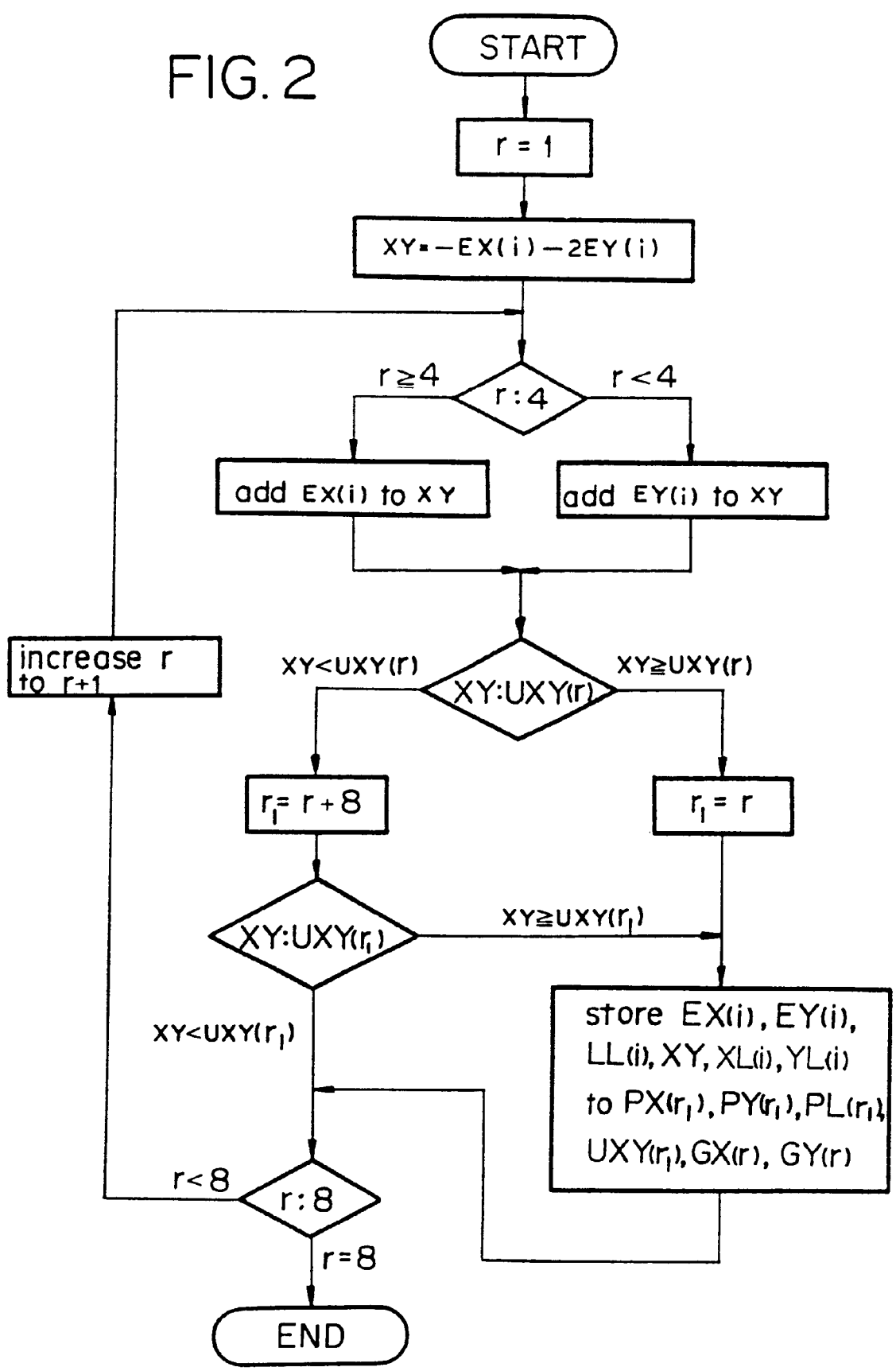
FIG. 2 is a flowchart diagram showing the calculation of comparison values (XY) for tile respective points for producing a list of outermost points and the process for storing the outermost points.

FIG. 1a is a block diagram showing the overall construction of a hardware system which is useful for explaining the principle of the invention, and FIG. 1b is a flowchart diagram showing the processing procedure for the system of FIG. 1a. The hardware system shown in FIG. 1a comprises a contour tracing unit 2 for receiving binary signals corresponding to the white and black portions of a two-dimensional character pattern of the input character from an optical scanner (not shown), a calculating unit 3 and a matching unit 4, and these units are arranged in a three-stage configuration. The respective stages are operated for the same processing time through a pipeline controller 5. The operation of this system is as follows. As will be seen from the flowchart of FIG. 1b, the input character is detected by a suitable scanning unit which detects, for example, 64×64 bits at 16 levels. The average values of the densities represented by the bits are converted into the corresponding binary signal form. The binary quantized signal is applied to the contour tracing unit 2 in which the input signal is subjected to tracing processing along the contour and the extraction of an outermost point is effected for each of the traced points of the input character. The calculating unit 3 extracts the concave and convex segments of the character from the outermost points. The calculating unit 3 also segments the contour into the respective convex line segments, concave line segments and hole segments and extracts the failure parameters for each of the segments by a method which will be described later. In the matching unit 4, a match is attempted between a set of masks in each category of feature of the dictionary and the input character, in accordance with the feature parameters. The name of the best matched category of the dictionary is generated as the result of the decision. More specifically, the binary quantized input signal 1 is stored in a two-dimensional memory 21 of the contour tracing unit 2. The contour is traced while controlling the access to the stored contents by an address controller 23 through a local controller 22 in response to the control signals from the pipeline controller 5. Simultaneously, an extracting circuit 24 extracts the outermost points in a plurality of predetermined directions for each of the traced points. Numeral 25 designates a buffer.

Extraction of Outermost Point

The outermost point is the outermost located point in a predetermined direction from a point on one series of contours forming a character. The extraction of outer most points will now be described with reference to FIGS. 2 to 4.

Figure 4:
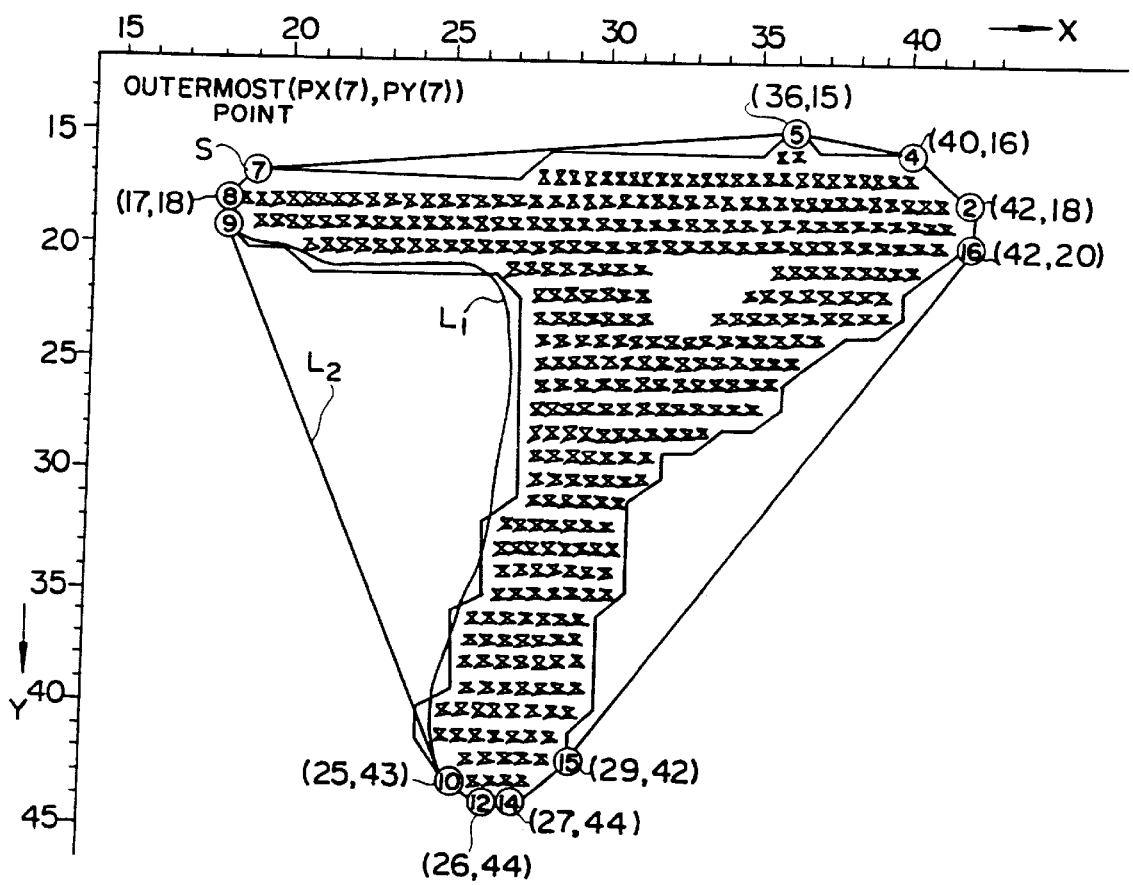
FIG. 4 is a diagram showing a binary quantized input character and the positions of the outermost points designated by numbers.

FIG. 2 is a flowchart showing the calculation of the comparison values (XY) made for the respective points to obtain a list of outermost points and the process for storing the outermost points, FIG. 3 is a diagram showing a list of outermost points by way of example, and FIG. 4 is a diagram showing the binary quantized black points (character portion) marked X and the positions of the corresponding outermost points by means of the two-dimensional coordinates (x, y).

Generally, where the input character is not a discrete one, the outermost points consist of the points at four directions of the top, bottom, right and left ends and are frequently used for character positioning purposes or as a character size normalizing factor. In accordance with the present invention, the outermost points of an input character are extracted, for example, for 16 directions instead of the four directions and they are used to determine the concave and convex structure of the character. The number of directions which is considered suitable is 16 from the practical point of view, although the invention is not intended to be limited to only this number.

The outermost points may be extracted in the following way:

(a) Scanning the bits in the two-dimensional memory 21 in a raster scan mode so as to discover any untraced contour (where the intended object of the scanning is the white ground and there is a black character at any one of the four adjacent points above, below, to the left, or to the right, but there is no line segment name near any of the 8 directions above, below, to the left, to the right, or diagonally, including the four diagonal directions.

(b) Scanning for tracing, in a contour tracing mode, the contours of the character pattern in the two-dimensional memory 21 from the starting point back to the starting point successively.

By storing the outermost points for the points traced on the contours, the outermost point, on the series of contours will be extracted. More specifically, considering a certain point i on the contour, if the point is outside the convex hull formed by the traced contour in accordance with the evaluation function in a direction r, the length along the contour from the starting point S of the tracing to the present point (EX(i), EY(i)) (in fact, the length is increased by 1 as NPi if the direction is vertical or horizontal, and the length is increased by 1 as LPi if the direction is diagonal) or NPi, LPi is stored in PX(r). PY(r), NP(r) and LP(r), respectively, and at the same time the integrated values of the respective X and Y coordinates for the contour from the point (r−1) to the point i (however, the coordinates of the point increased by 1 as LPi are excluded) or XL(i) and YL(i) are respectively stored in SX(r) and SY(r). When the contour has been traced completely, the coordinates (PX(r), PY(r)) of the outermost point in each direction r, the length NP(r) and LP(r) along the contour from the starting point S to the outermost point in the direction r and the sums SX(r) and SY(r) of the coordinate values along the contour from the point (r−1) to the outermost point are obtained for the outermost points in the 16 directions.

In this way, a list of outermost points r=1~16 (PX(r), PY(r), NP(r), LP(r), SX(r), SY(r)) is obtained. One example of such list is shown in FIG. 3 and the list represents the entire data on the outermost points which is applied to the calculating unit 3 for the line segment structure extracting purposes.

Extraction of Line Segment (Concave, Convex, Hole)

The calculating unit 3 comprises a calculator 31 for performing the extraction of line segments from the outermost points, the segmentation of contour into line segments and the extraction of feature parameters for the line segments as will be described later, a local controller 33 responsive to the control signals from the pipeline controller 5 to control the operation of the individual circuits and input and output buffers 33 and 34.

FIG. 5 shows the relation between the direction θi of the line element at a certain traced point on the contour. FIG. 6 shows the contents of a coordinate memory having a memory length n=3 and the positions of a pointer i', and the directional accuracy and the resistance to noise may be improved by increasing the memory length n but with the corresponding complication in the construction of the memory. FIG. 7 shows a angle conversion matrix and its content.

In order to extract the concavity and convex segments of the character from the outermost points, the contour of the character is segmented into a plurality of line segments according to predetermined conditions. This process is called as an extraction of line segments. In accordance with the invention, each contour is segmented according to the following convex and concavity discrimination conditions.

More specifically, noting the (r, r+1) mod 16 segments according to the list of outermost points, the following values are calculated $$rL = NP(r) - NP(r-1) - (2-\sqrt{2})(LP(r) - LP(r-1)) \quad (1)$$

$$rL\sqrt{(PX(r+1) - PX(r)) + (PY(r+1) - PY(r))} \quad (2)$$

$$rL_{12} = rL_1 - rL_2 \quad (3)$$

and also $$XPG = SX(r)/rL_1 \quad (4)$$

$$YPG = SY(r)/rL_1 \quad (5)$$

$$XPC = (PX(r+1) + PX(r))/2 \quad (6)$$

$$YPC = (PY(r-1) + PY(r))/2 \quad (7)$$

$$PC = [(PY(r) - PY(r+1)) \cdot (XPG - XPC) + (PX(r+1) - PX(r)) \cdot (YPG + YPC)]/rL_2 \quad (8)$$

In accordance with the above $rL_{12}$ and PC, if $rL_{12} \geq$ (1c is a specified value) and PC$\geq \Delta$PC ($\Delta$PC is a specified value) the segment is considered a concave segment and the other segments are considered convex segments. The contour portion consisting of such a concave segment is extracted as a concave line segment and the similar process is accomplished for each of the 16 directions so as to extract consecutive convex segments as a unified convex line segment.

Figure 10:
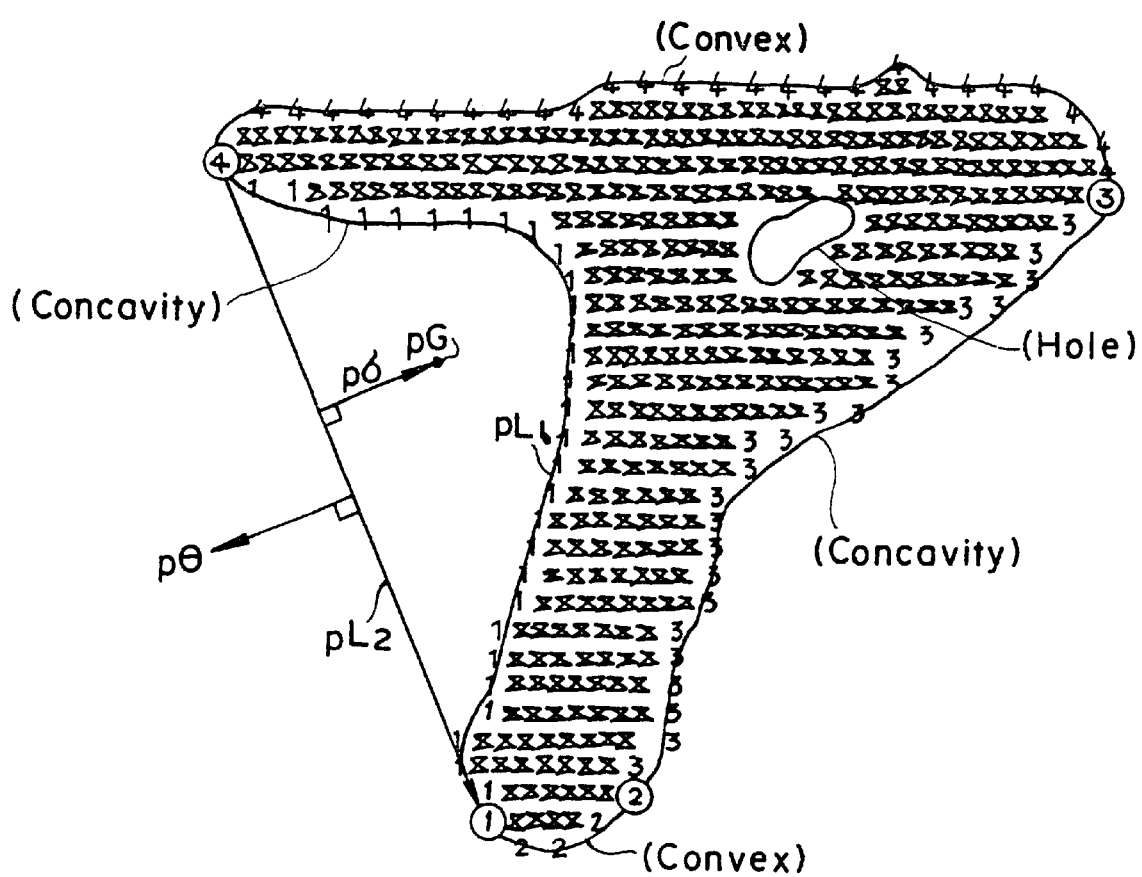
FIG. 10 is a diagram showing the segments derived from the list of outermost points.

For instance, if a point r is represented by (PX(r), PY(r)), then assuming that the segments (r, r+1) and (r+1, r+2) represent convex segments, the locus PL along the convex line segments on the contour is the line segment from the point r to the point r+2 and $pL_1 = rL_1 + rL_2$. On the other hand, the straight line segment from the point r to the point r+2 represents a straight line segment $pL_2$ interconnecting the starting and ending points of the convex line segment. In FIG. 10 the straight line segment $pL_2$ represents the length of $L_2$ in FIG. 4 and $pL_1$ represents the length of $L_1$ in FIG. 4. In this case, s represents the name of line segments and the line segments in the order of their detection as shown in FIG. 10 by the numbers 1, 2, 3 and 4 which are stored as information for the respective traced points.

In addition to the above $pL_1$ and $pL_2$ and the index of concavity and convex, the following feature parameters are extracted pG: the center of gravity $(X_{pg}, Y_{pg})$ of $pL_1$ p$\theta$ the right-hand direction perpendicular to the straight line segment from the starting point to the ending point of $pL_2$ p$\sigma$: the length of a perpendicular drawn from pG to $PL_2$ which is given as follows, if the coordinates of the starting and ending points of $PL_2$ are respectively represented by (Xps, Yps) and (Xpe, Ype)

$$p\sigma = \frac{(Yps - Tpe) \cdot (Xpg - Xps) - (Xpe - Xps)(Yps - Ypg)}{\sqrt{(Xpe - Xps)' + (Ype - Yps)'}}$$

H(16): the angular distribution, quantized in 16 directions, of the right-hand direction $\theta_i$ perpendicular to the line segment at a traced point i on the contour.

Although the direction $\theta_i$ may be obtained mathematically from the coordinates of the preceding traced points up to the point (i−n) and the coordinates of the present point with the use of a sine function as shown in FIG. 5, in practice the direction $\theta_i$ can be obtained simply at a high speed in the following way.

In other words, the direction $\theta_i$ of a given traced point i can be given by referring to a memory $L_G$ storing therein: the coordinates of the preceding traced points up to the point (i−n), as shown in FIG. 6, a pointer i' indicating the coordinates of the point (i−n) in the memory $L_G$ and a separate angle conversion matrix TMX of (2n+1)×(2n+1) having the direction values stored therein as shown in FIG. 7, as follows $$K = (ex - ex'_i) + (2n + 1)(ey - ey'_i) + 2n(n + 1) + 1$$

$$= (ex - ex_i 1) + 2n(ey - ey'_i) + ey - ey'_i + 2n(n + 1) + 1$$

$$= (ex - ex'_i) + 4(ey - ey'_i) + (ey - ey'_i) + 13(n = 2)$$

(2-bit shift and four additions)

$$= (ex - ex_i) + 5(ey - ey'_i) + 13 \quad \theta_i i = -TMX(K) \quad (K = 1 \sim 25)$$

In other words, K is obtained from the difference between the present coordinates (ex, ey) and the coordinates (ex$_i$', ey$_i$') in the memory $L_G$ which are indicated by the pointer i', and the direction $\theta_i$ is directly derived from this K and the matrix TMX. After the direction $\theta_i$ as been obtained, the coordinates (ex, ey) are substituted in the area $L_{G(i')}$ indicated by the pointer i' and the pointer i' is increased by 1. (i' is the mod of n).

Thereafter, this process is performed repeatedly to obtain the directions $\theta_i$ for the other traced points.

Extraction of Inner Structure (Partial Outermost Point and its Function)

Referring now to FIGS. 8a and 8b, the extraction of an inner structure will be described. FIG. 8a shows by way of example an input character including an inner protrusion, and FIG. 8b shows the corresponding concave line segment, the positions of the inner outermost points for the character, the features $rl_{i1}$ and $rl_{i2}$ representing the inner structure, and the direction r$\theta$I of the inner protrusion.

The extraction of the outermost points for the entire contours has been described so far, and if the extraction of outermost points is confined to a single concave line segment, the difference between the length $rl_{i1}$ along the contour between the successive outermost points and the euclidean distance $rL_{i2}$ between the points or $rLI = rL_{i1} - rL_{i2}$ will be increased similarly as in the case of the previously described concavity detection conditions for the inner protrusion projected internally of the concave segment and this may be utilized to extract the inner structure so as to represent the outermost point of the concave line segment in the open direction I for $rL_{i1}$ and $rL_{i2}$.

Extraction of Hole

The method of extracting concave and convex line segments has been described so far and the extraction of hole segments is accomplished by the calculator 31 in the following manner.

FIG. 9 shows that if the same tracing conditions are used, the signs of pL(9)–pL(1) of the outer contour and the hole respectively will become opposite to each other, since the outer contour is traced counterclockwise and the hole is traced clockwise. In FIG. 10, the segments derived from the outermost points are indicated as concave, convex and hole, the encircled numbers indicate the segmentation points of the contours and each group of the same numbered contour points indicates the locus of the line segment. FIG. 10 also shows by way of example the positions of $pL_1$, $pL_2$, $p\theta$, $p\sigma$ and $pG$ and the relation therebetween for the concave line segment represented by the number 1.

In the case of an input character including a hole as will be the case with "0", when the extraction of outermost points for the inner contour of the hole is effected by the contour tracing unit 2, if, in the tracing mode, the tracing is effected so as to trace the just preceding white portion while the black or print portion is located on the left side compared to the direction of tracing, the contour will be traced clockwise resulting in pL(9)–pL(1)>0. In other words, the sign resulting from tracing an inner contour is opposite to that obtained when tracing an outer contour of the input character. As a result, in the calculator 31 the clockwise tracing locus is not segmented but considered as a single hole because of the opposite sign and the hole is handled in the same manner as each of the previously described concavity and convex line segments. In this case, the starting point S(p) of the hole is the same as its ending point E(p) so that $pL_2=0$ and $pL_1$=the length of the contour.

In the case of a discrete character composed of a plurality of discrete constituent elements resulting in a plurality of contours, the contours which have already been detected and traced by the starting conditions of the scanning in the contour tracing, have their own segment names so that when any contour having no segment name is detected, it is guaranteed that the detected contour is a new contour. In this way, when all the bits of the input character in the two-dimensional memory 21 have been scanned, each of the contours forming the input character has been given its own segment name, as shown in FIG. 10, and the corresponding feature parameters (feature axis) have been obtained as shown by way of example in FIG. 11. The feature parameters for the segments represented by the encircled numbers in FIG. 10 are respectively shown in the columns designated by the corresponding parenthesized numbers in FIG. 11.

Next, the matching unit 4 will be described. The unit 4 comprises a dictionary memory 41, a calculator 42 for performing the computational operations which will be described later, an input buffer 43, a matching logic circuit 44 and a local controller 45 responsive to the control signals from the pipeline controller 5 to control the individual circuits, and the matching unit 4 operates according to the flowcharts shown in FIGS. 12 and 13.

More specifically, of the input feature (feature table), the short convex line segments shorter than a predetermined length are rejected, and the upper and lower limit values of all the feature parameters are compared for the feature axes of each of the other segments. FIG. 12 shows the method of detecting the degree of matching Dj with each category feature of the dictionary, in which q designates a corresponding feature name (segment name), i the designated content of a corresponding feature axis, Iiq the input value, UiqJ the upper limit value of the mask, Wiq the weight of an axis i, $E_{Ui}$ the upper tolerance, $E_{Li}$ the lower tolerance, Dmin and Ddif the rejection constants and j the name of the category feature of the dictionary.

If there is no segment dictionary name corresponding to the segment, the input segment is considered to be a short convex segment and the matching is effected for LI only.

Figure 13:
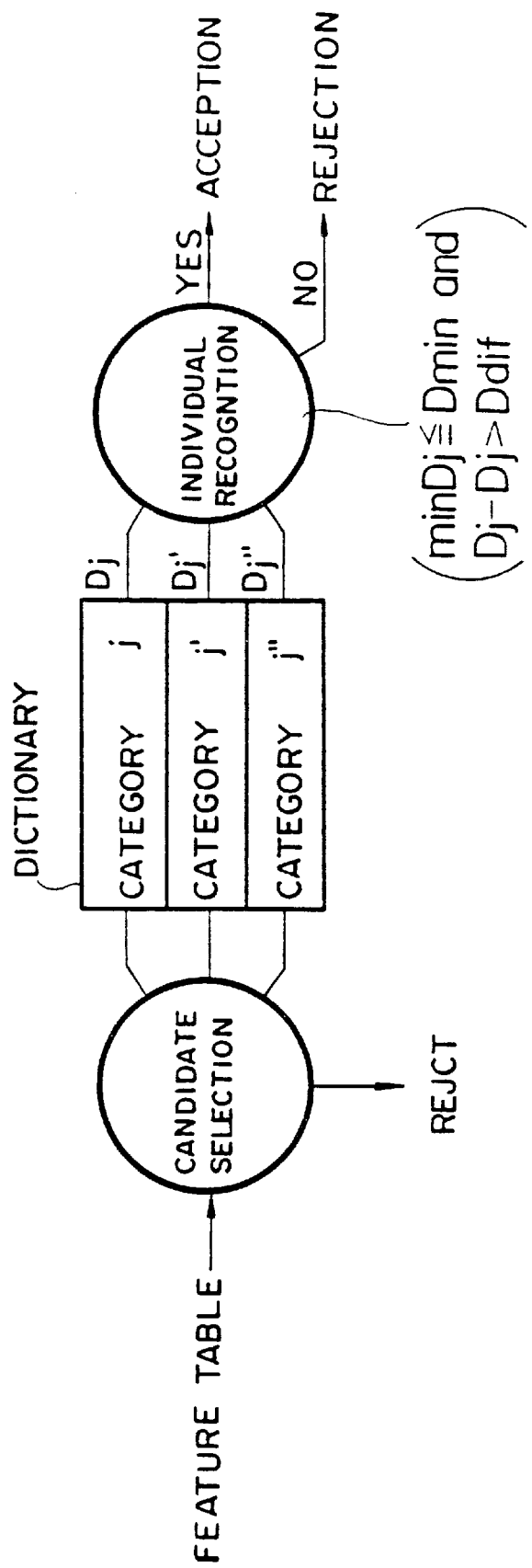
FIG. 13 is a flowchart diagram useful for explaining the selection of the optimum matching dictionary.

FIG. 13 shows the selection of a subset of the category in the dictionary according to the candidate selection and the rejection of input when there is no subset of the category feature and FIG. 13 also shows the process by which the matching degrees Dj obtained for the selected category of the dictionary are compared to each other to obtain the result of recognition of the input character, whereby the input character will be rejected if there is no Dj which meets the requirements.

The matching is accomplished by performing the candidate selection, the calculation of matching degrees and the selection of the category feature having a minimum value.

The candidate selection is effected by subjecting the input parameters of feature to a candidate selection in accordance with the number of discreet, unattached areas of an input character, the total number of segments φ, and the number of holes, and by selecting the subject of the category in the dictionary.

Now, the construction of the dictionary corresponding to the respective subset of the category will now be described.

The dictionary comprises a plurality of category features each having some masks. Each mask comprising the total number of line segments φ is generally comprised of φ feature vectors of respective segments and each of the feature vectors is comprised of feature axes of a fixed number K. Each of the feature axes comprises an upper limit value UiqJ and a lower limit value Liqj.

Figure 15A:
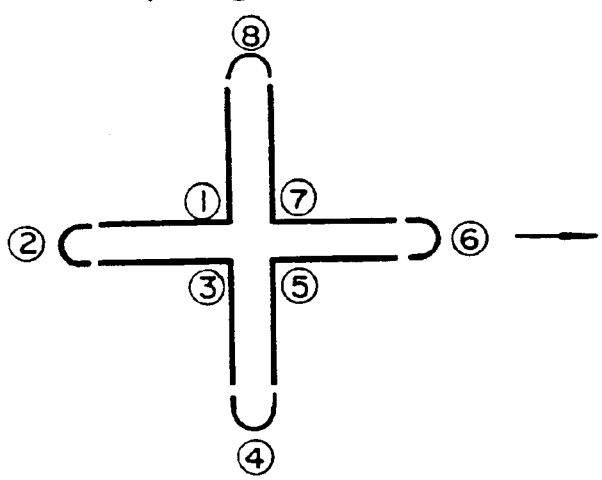
FIGS. 15a and 15b are diagrams showing exemplary character contours useful for explaining the effect of rejecting the shorter convex line segments.
Figure 15B:
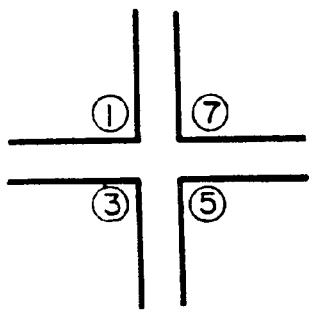

In the course of a learning for the preparation of the feature vector corresponding to each segment, if the input segments include any short convex segments, then no corresponding feature vectors are prepared for such segments, but each of the short convex segments is identified by a mark. The determination of short convex segments is accomplished by the calculating unit 3 in the course of the learning. The detection of short convex line segments is effected by the calculating unit 3 and the feature vectors for the thus detected short convex line segments are not supplied to the matching unit 4. For example, when the input character is the sign "+", in the case of the prior art system the number of the feature vectors in each of the masks must be equal to the number φ of the line segments (1) to (8) as shown in FIG. 15a and consequently the eight feature vectors must be prepared. In accordance with the present invention, however, it is so designed that it requires only as many line segments as there are concave line segments in the input character, that is, only the four feature vectors corresponding to the concavity line segments (1),i (3), (5) and (7) are required as shown in FIG. 15b. In this way the memory capacity requirements for the dictionary can be reduced to one half the capacity required previously.

FIG. 14 is a diagram showing the types and contents of one of the masks in the category feature of the dictionary corresponding to the exemplary character. Each of the masks stores the upper and lower limit values of the parameter of feature for the feature vector of the corresponding segment.

Logics of Matching

The logics for matching will now be described. To effect the matching, the categories of the dictionary selected by the candidate selection are each subjected to the logical operations shown in FIG. 12 and the degrees of matching Dj between the input feature table and the feature vectors of the mask are obtained. In other words, if the content Iiq of the input feature axis i is between (the upper limit value+the upper tolerance) and (the lower limit value−the lower tolerance), a distance is obtained which is determined by multiplying the largest one of the values of: (Iiq−the upper limit value), (the lower limit value−Iiq), and zero, by the weight which is dependent on the axis i. If the content Iiq is greater that (the upper limit value+the upper tolerance) or smaller than the lower limit value−the lower tolerance, a very large constant is selected for the distance in a sense of rejecting it logically. This distance on the axis i is measured for all the axes of the same feature vector and then added to obtain the matching degree Dj of the mask, whereby the degree of deformation on each of the axes is checked to see whether it is within a predetermined tolerance, and, simultaneously, the degree of deformation of the whole input character as compared with the masks is obtained as a measured quantity. Then, as shown in FIG. 13, the degrees of matching of all the prospective categories are compared with each other to obtain the lowest value Dj and the next lowest value Dj', whereby when the lowest value Dj is smaller than the allowable maximum distance Dmin and also the value of Dj'−Dj is greater than the tolerance Ddif for the next lowest value Dj'. The value Dj of this category is accepted as the result of the decision. If there is no Dj which satisfies the requirements, the input character is rejected.

Figure 16A:
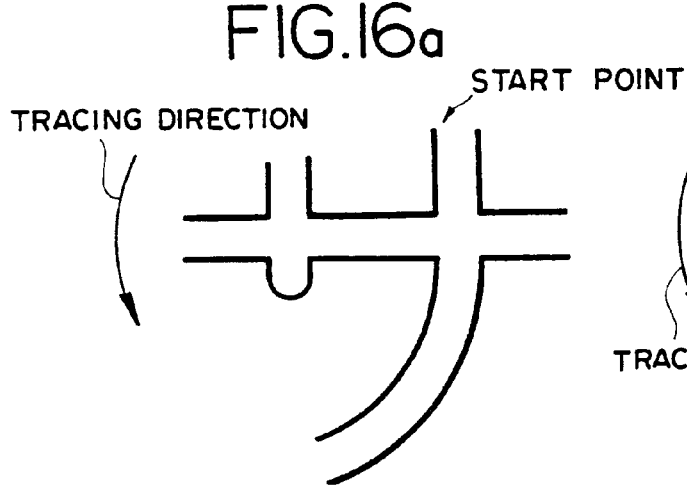
FIGS. 16a and 16b are diagrams showing the contours of the same character whose line segments will be named differently depending on the deformation of the character.
Figure 16B:
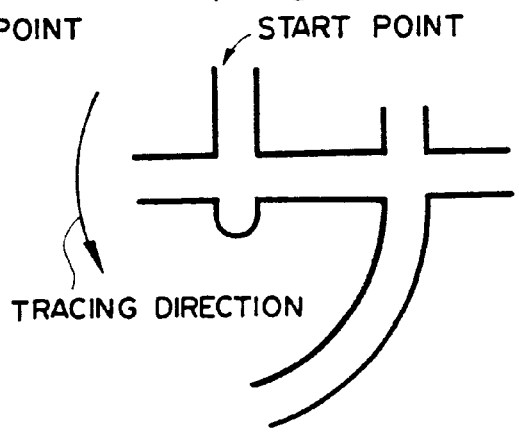

With the matching operation described above, if an input character is, for example, deformed as shown in FIGS. 16*a* and 16*b* so that the starting points of tracing differ from each other and the resulting line segments are designated differently, it will be necessary to increase the number of masks for each of categories. In accordance with the invention, this will be prevented in the following manner.

Figure 17A:
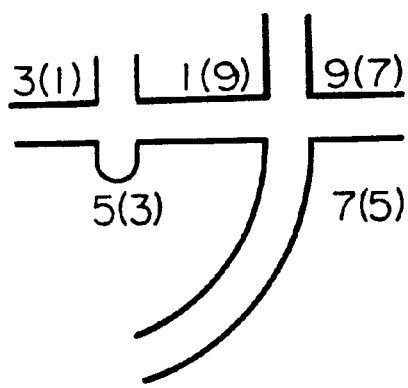
FIGS. 17a and 17b are diagrams showing by way of contour lines the changes in the grouping of line segments and the corresponding dictionary contents.
Figure 17B:
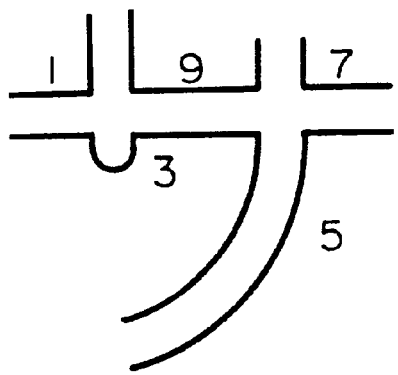

More specifically, when the line segments are processed by the calculating unit 3, as shown in FIG. 17*a*, two feature groups are supplied to the matching unit 4. The first-category group (the unparenthesized numbers) includes feature parameters of the line segments designated in the order of their detection. The second-category group (the parenthesized numbers) includes the feature parameters of the line segments which are designated by noting the concave line segments in the first category group so as to reorder the segments so that the second concave line segment is now the first concavity line segment. On the other hand, as shown in FIG. 17*b*, the category feature including the corresponding deformation is provided with a specific mark and the mask for the line segments corresponding to the second-category groups are stored in the category feature of the dictionary. When a match is attempted between the input feature parameter and the dictionary in the matching unit 4, in the absence of the specific mark, a match is attempted between the first-category group and the dictionary, and the decision is made in the similar manner as mentioned previously. When there is the specific mark, the control is effected in accordance with the presence or absence of the specific mark so that a match is attempted between the feature parameters of the second-category group and the dictionary in addition to the specific mark. In this way, no additional dictionary will be required by a deformed character and the memory capacity will be reduced.

The above-described pattern reading system of the present invention will now be described in greater detail with reference to specific embodiments of the contour tracing unit 2, the calculating unit 3 and the matching unit 4. More specifically, the contour tracing unit 2 has a basic construction as shown in FIG. 1 and it can be engineering, in practice, as shown in FIGS. 18 to 24 by way of example. Also, a practical embodiment of the calculating unit 3 is shown in FIGS. 25, 26*a*, 26*b* and 26*c*, and a practical embodiment of the matching unit 4 is shown in FIGS. 27, 28*a*, 28*b*, 29, 30*a* and 30*b*.

Figure 18:
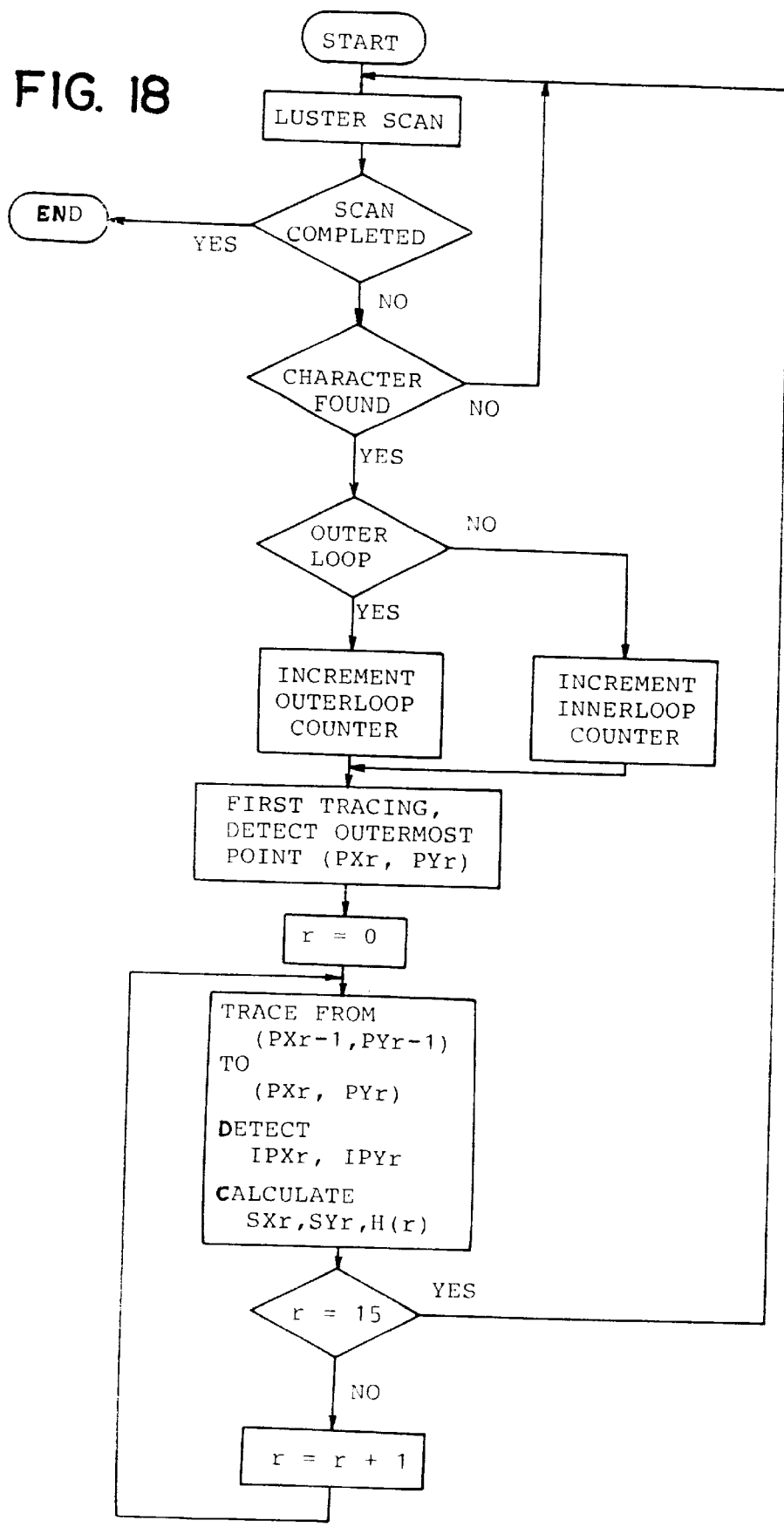
FIG. 18 is a flowchart showing a specific flow of operations of the contour tracing unit 2.
Figure 19:
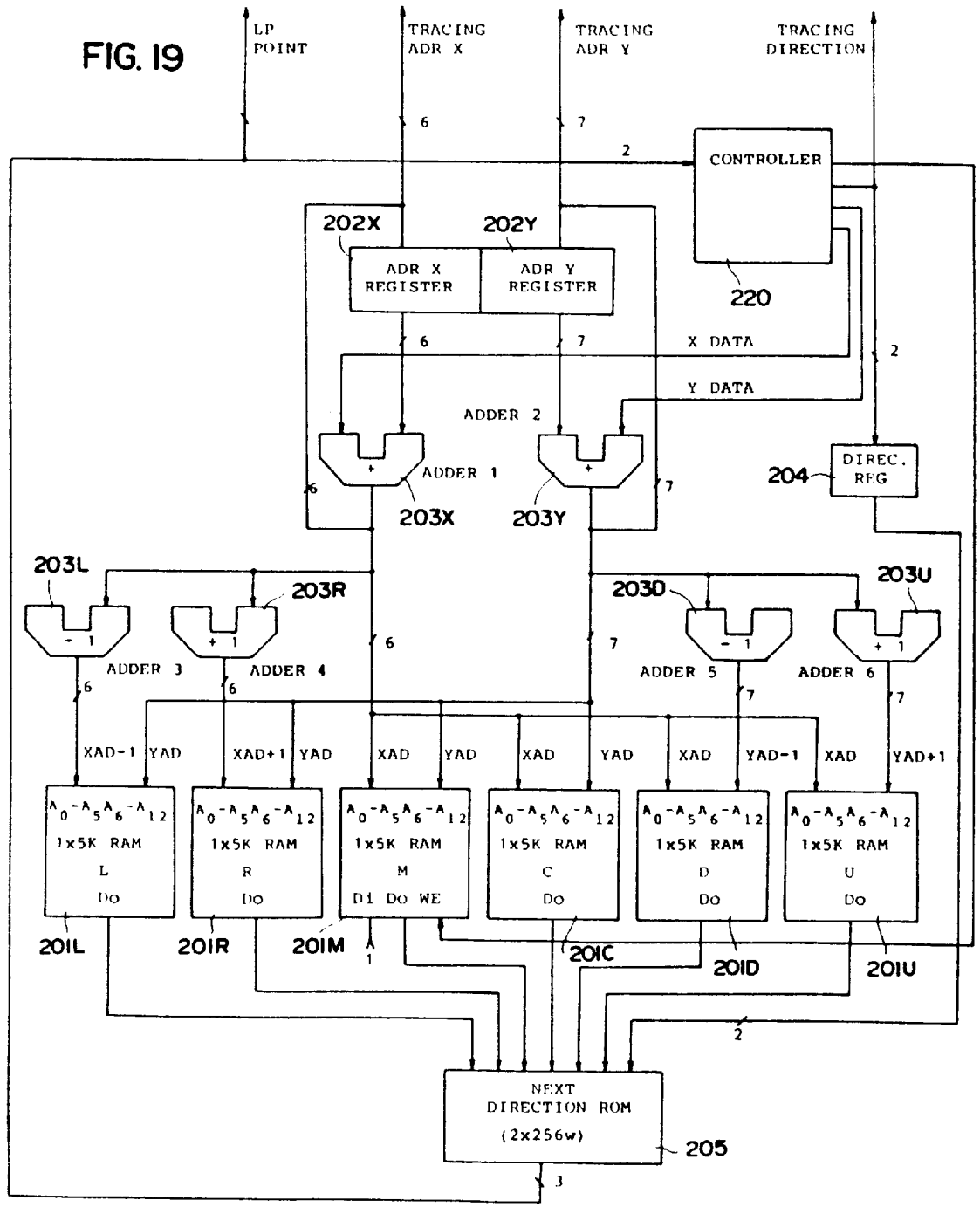
FIG. 19 is a block diagram showing by way of example a specific construction of the tracing circuit in the contour tracing unit 2.
Figure 22:
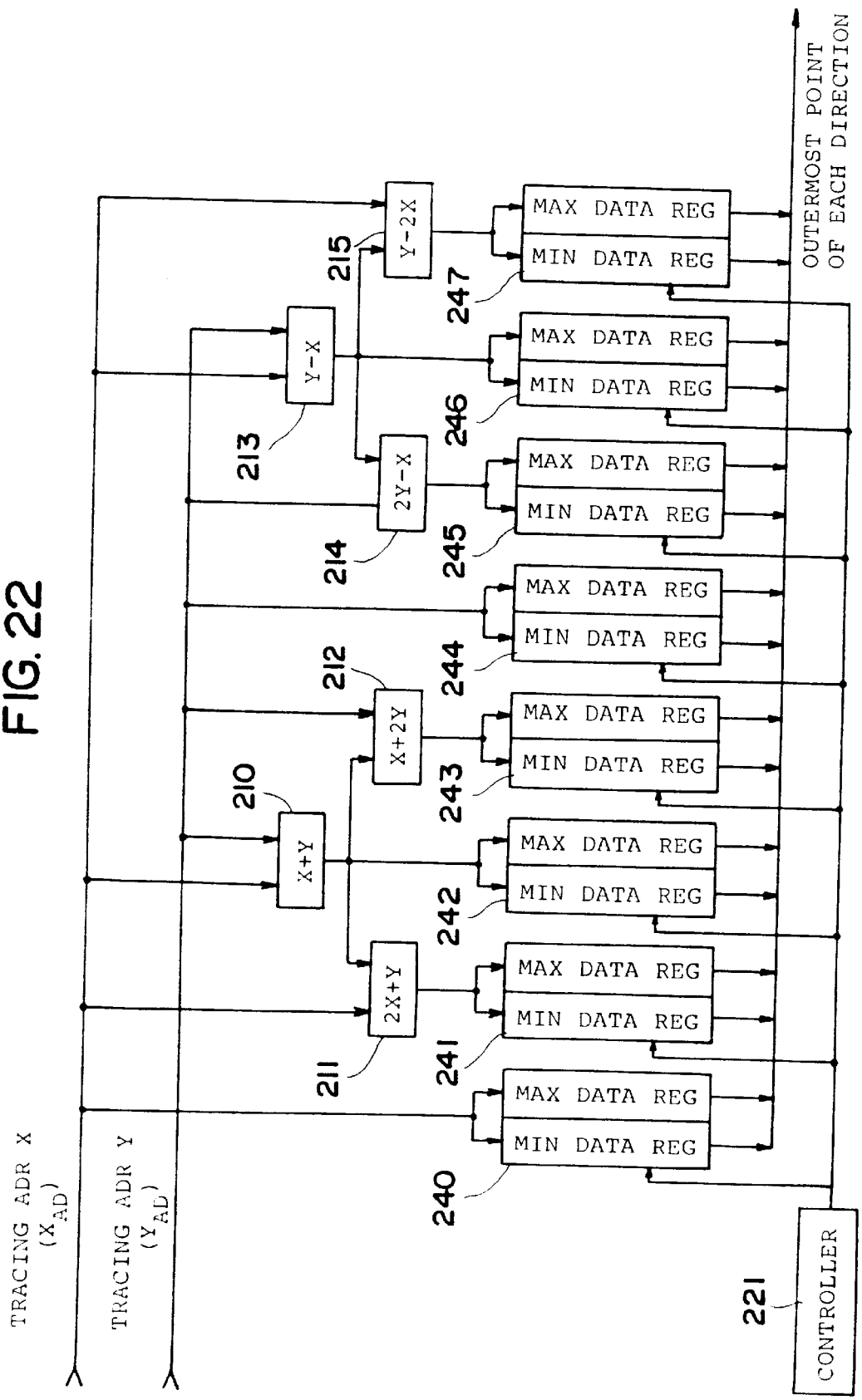
FIG. 22 is a block diagram showing by way of example a specific construction of the outermost point detecting circuit in the contour tracing circuit 2.
Figure 23:
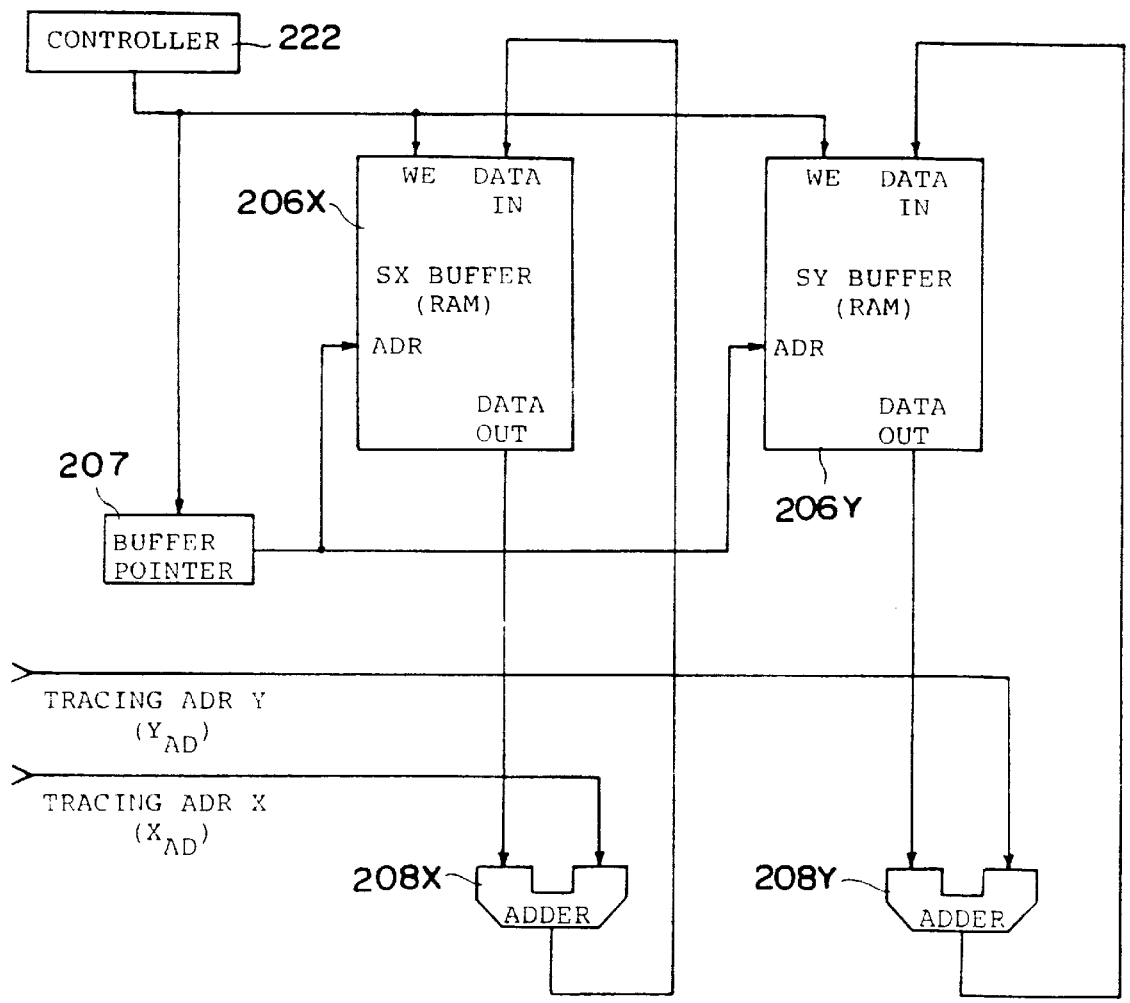
FIG. 23 is a block diagram showing by way of example a specific construction of the tracing coordinate integrating circuit in the contour tracing unit 2.
Figure 24:
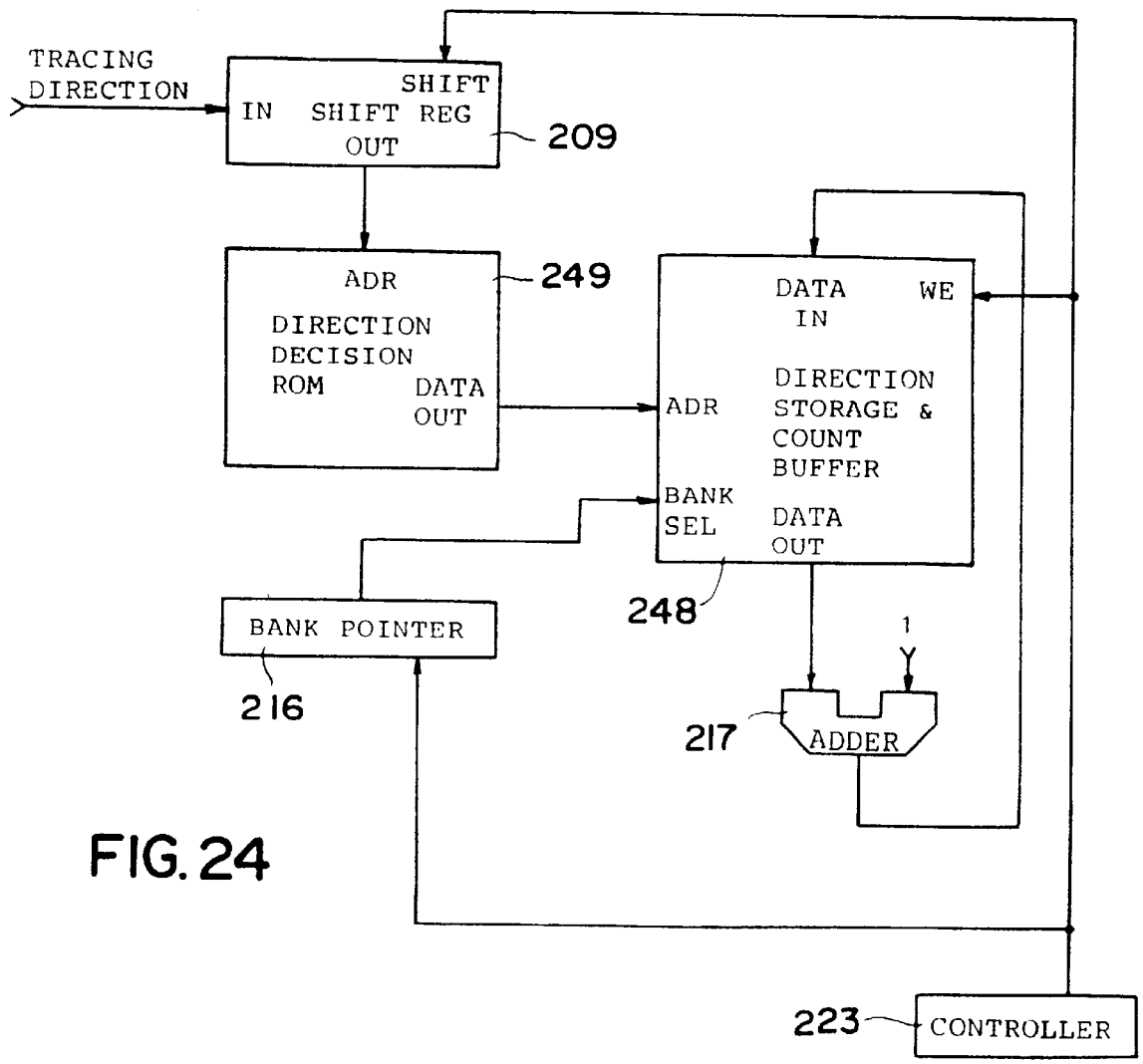
FIG. 24 is a block diagram showing by way of example a specific construction of the H(r) detecting circuit in the contour tracing unit 2.

The contour tracing unit 2 comprises a tracing circuit constructed as shown in FIG. 19, an outermost point detecting circuit as shown in FIG. 22, a traced coordinate integrating circuit as shown in FIG. 23, and an H(r) detecting circuit as shown in FIG. 24. In the present embodiment, the contour of a character found by a raster scan is practically traced two times, that is, the first tracing determines the PX(r) and PY(r) and the second tracing detects or calculates the SX(r), SY(r), H(r), IPXR and IPYR between the points (PX(r−1), pY(r−1)) and (PX(r), PY(r)). This procedure is shown by the flowchart of FIG. 18.

The tracing circuit is constructed as shown in FIG. 19 and it is assumed that the data to be recognized are written in the same manner in the respective planes L, R, C, D and U of random access memories or RAMs 201L, 201R, 201C, 201D and 201U, and that the plane of an RAM 201M has already been cleared entirely. It is also assumed that the trace starting point has been found by the raster scan and its data or its X and Y coordinates are respectively stored in address registers 202X and 202Y. In addition to these prerequisite conditions, preferably the data of the trace starting point may also be stored in a separately provided register so that when the X and Y coordinates coincide with the content of the separate register, it is detected by a magnitude comparator to complete the tracing.

Figures 20, 21:
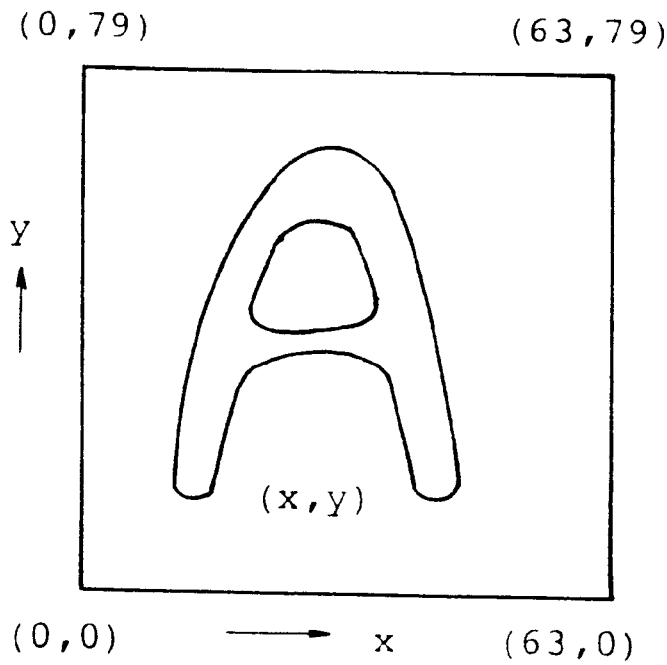
FIG. 20 is a diagram for explaining the manner of determining a coordinate system corresponding to an input pattern.
FIG. 21 is a diagram showing the manner of allocating the addresses of the input pattern whose coordinate system has been determined.

Regarding the addresses and coordinates in the plane of each RAM, the coordinate system for an input pattern is determined to contain the input pattern, as shown in FIG. 20, and the addresses are assigned to the respective points on the coordinate system as shown in FIG. 21. In this way, each of the RAMs has its X coordinates allocated to six bits $A_0$ to $A_5$ and its Y coordinates to seven bits $A_6$ to $A_{12}$. As a result, the data of a point a $(X_{(2)}, Y_{(2)})$ are stored at an address $Y_{(2)} X_{(2)}$ in the RAM. In this case, the $X_{(2)}$ is a 6-bit binary number and the $Y_{(2)}$ is a 7-bit binary number and the $Y_{(2)} X_{(2)}$ is a 13-bit binary number consisting of the first 7 bits or the binary number of $Y_{(2)}$ and the last 6 bits or the binary number of $X_{(2)}$.

In FIG. 19, the address register 202A is connected to an adder 203X in loop form so as to form a programmable counter which operates as a down counter when the X data from a controller 220 is −1 and as an up counter when the X data is +1. In the like manner, the address register 202Y is connected to an adder 203Y in loop form, thus forming a programmable counter which operates as a down counter when the Y data from the controller 202 is −1 and as an up counter when the Y data is +1. The other adders 203L, 203R, 203D and 203U are such that +1 or −1 is added constantly to the output of the adder 203X or 203Y forming the programmable counter and the resulting output is applied to one of the RAMs 201L, 201R, 201D and 201U having the same suffix. In this way, the addresses $(X_{AD-1}, Y_{AD})$, $(X_{AD+1}, Y_{AD})$, $(X_{AD}, Y_{AD-1})$ and $(X_{AD}, Y_{AD+1})$ of the points on the left, right, lower and upper sides of the object point $(X_{AD}, Y_{AD})$ are applied to the respective RAMs in combination with the outputs of the adders 203X and 203Y. The RAM 201C includes the plane in which the object point $(X_{AD}, Y_{AD})$ is written and its address is supplied from the adders 203X and 203Y. The plane M-RAM 201M is always supplied with the same address as the object point plane (RAM 201C) and during the tracing the control signal is applied from the controller 220 to its WE terminal for writing "1". Numeral 204 designates a direction register whereby the direction of movement of the object point is encoded into two bits for the upper, lower, right or left direction and stored for each time. Numeral 205 designates a read-only memory or ROM for indicating the next direction of movement of the object point. The direction in which the point is to be moved next is supplied to the controller 220 in response to the address inputs from the RAMs and the direction register 204. The direction of movement from the current object point to the next object point can be determined linearly from the following three data.

(1) the direction of movement of the object point from the preceding time to the present time;
(2) the patterns of the points on the upper, lower, right and left sides of the current object point; and
(3) the tracing mark of the object point at the present time.

Thus the next directions of movement corresponding to various combinations of address inputs are stored in the ROM 205 so as to control the controller 220 in accordance with the inputs. The ROM 205 is designed so that if, for example, the object point is a corner point, the controller 220 is informed that the length of movement to the next object point is $\sqrt{2}$.

In accordance with the direction of movement designated by the ROM 205, the controller 220 supplies a suitable numerical value to each of the adders 203X and 203Y and the designated direction of movement to the direction register 204. For instance, if the object point is to be moved upward (the direction U), 0 is applied to the adder 203X and +1 is applied to the adder 203Y. If the point is to be moved to the left (the direction L), −1 is applied to the adder 203X and 0 is applied to the adder 203Y.

The outermost point detecting circuit is constructed as shown in FIG. 22 and it is responsive to the tracing coordinates ($X_{AD}$, $Y_{AD}$) from the adders 203X and 203Y to generate the outermost point coordinates in the respective vector direction. Arithmetic circuits 210, 211, 212, 213, 214 and 215 are connected to the adders 203X and 203Y of the tracing circuit to calculate X+Y, 2X+Y, X+2Y, Y−X, 2Y−X and Y−2X of an input (X, Y), and a plurality of data registers 240 to 247 are provided to store the computed results of the arithmetic circuits 210 to 215 and the X and Y coordinates indicating the maximum and minimum values of X and Y. The outermost point data in the data registers 240 to 247 are read out in response to the command from the controller 220.

The tracing coordinate integrating circuit is constructed as shown in FIG. 23 and the circuit integrates the coordinates traced from the outermost point (r−1) to the point (r). In the figure, a buffer pointer 207 performs the addressing of an SX buffer 206X adapted to store SX(r) and an SY buffer 206Y adapted to store SY(r) under the control of a controller 222. Each of the SX buffer 206X and the SY buffer 206Y comprises a RAM and they are initially cleared. The tracing X coordinate ($X_{AD}$) from the adder 203X of the tracing circuit is added to the content of the SX buffer 206X by an adder 208X and the resulting sum is stored in the SX buffer 206X. In the like manner, the tracing Y coordinate ($Y_{AD}$) from the adder 203Y is added to the content of the SY buffer 206Y by an adder 208Y and the resulting sum is stored in the SY buffer 206Y. These operations are repeated to perform the operations of integration. The integration is performed for each of the points from the outermost pont (r−1) to the outermost point (r), inclusively.

The H(r) detecting circuit shown in FIG. 24 produces direction histogram of the traced segment from the tracing direction series from the outermost point (r−1) to the outermost point (r). In FIG. 24, the same four tracing direction data, as supplied to the direction register 204 from the controller 220 of the tracing circuit, are sequentially shifted and stored in a shift register 209. The output of the shift register 209 is applied as an address to a direction decision ROM 249, which in turn supplies an output direction, corresponding to the input address, to a direction storage and count buffer 248. A bank pointer 216 addresses a particular bank of the buffer 248 into which is sent the currently handled histogram of the segment from the outermost point (r−1) to the outermost point (r). The buffer 248 is initially cleared so that each time a tracking direction data is supplied, an adder 217 adds 1 to the content of the address, addressed by the ROM 249, and included in the bank addressed by the bank pointer 216, thus detecting H(r).

Figure 25:
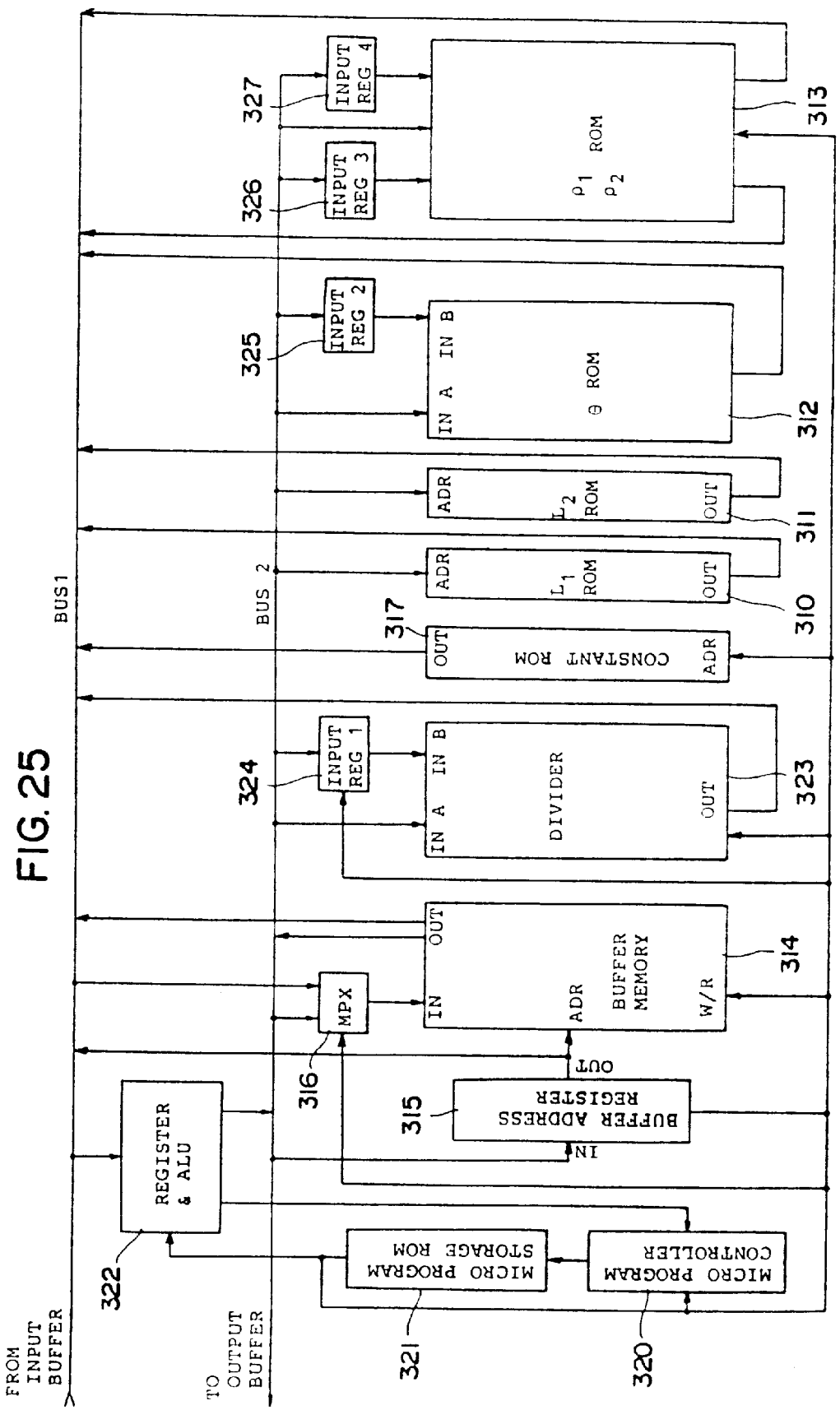
FIG. 25 is a block diagram showing by way of example a specific construction of the calculator 31 in the calculating unit 3.
Figure 26A:
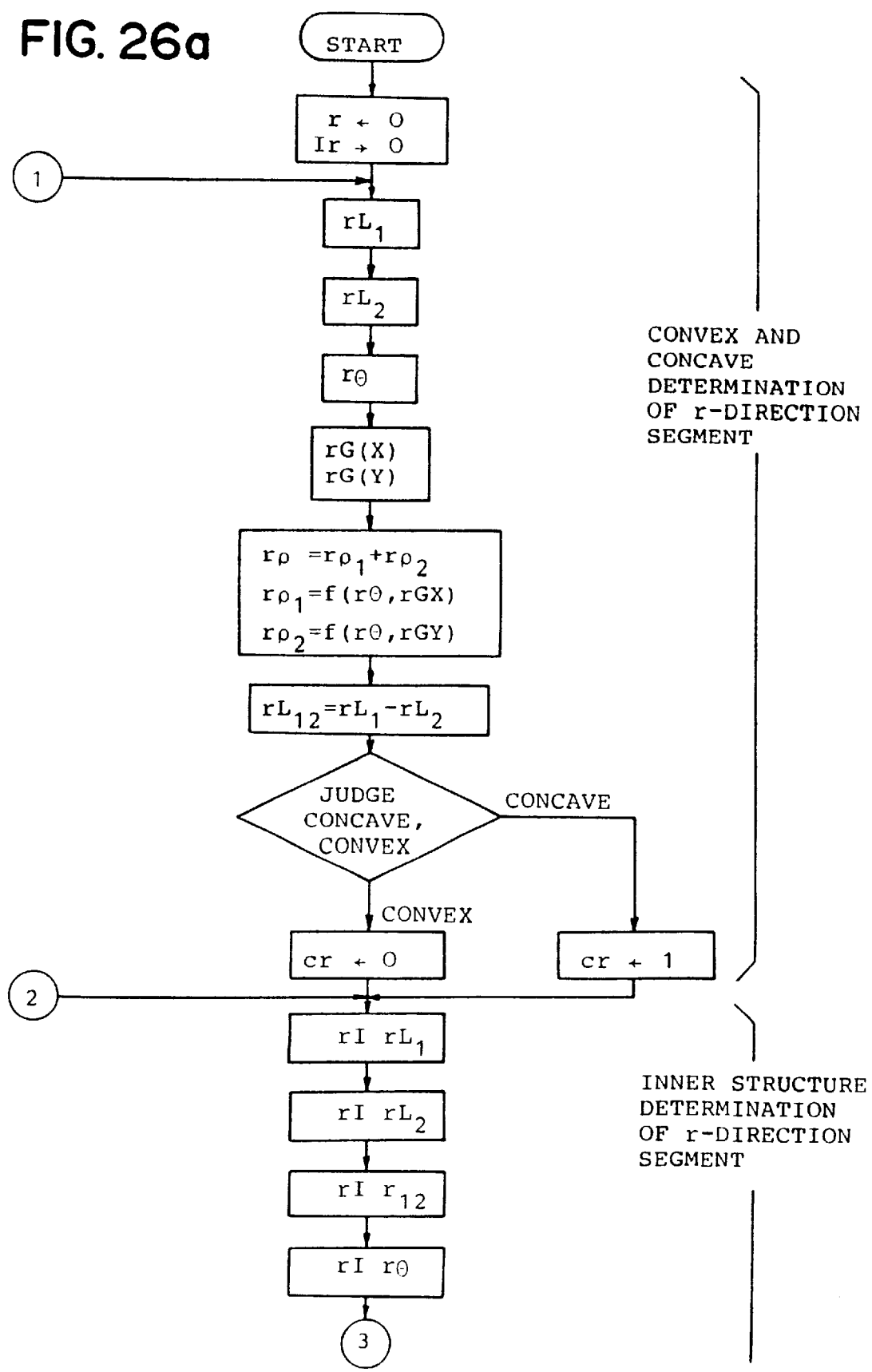
FIGS. 26a, 26b and 26c show a flowchart illustrating a specific flow of operations of the calculating unit 3.
Figure 26B:
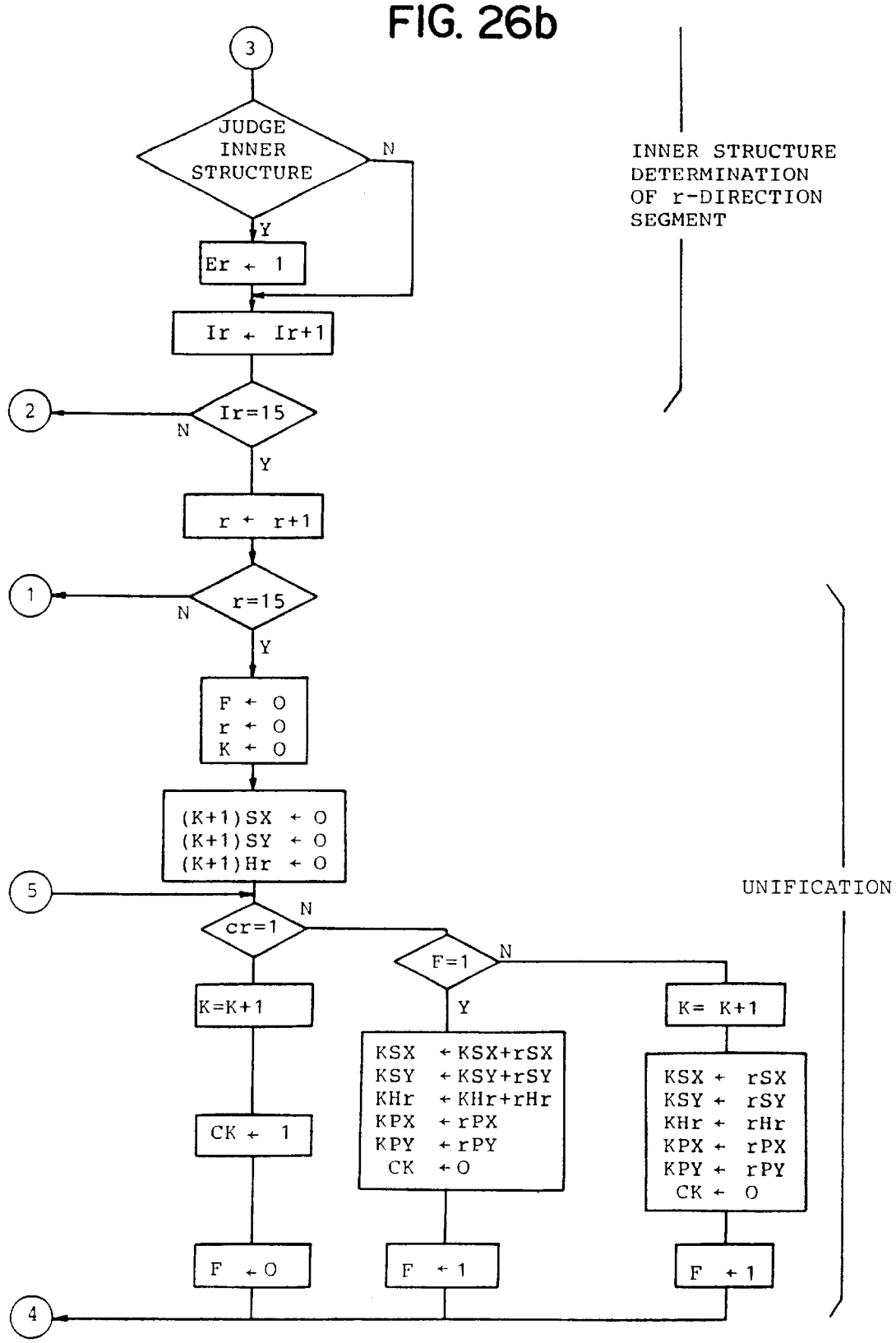
Figure 26C:
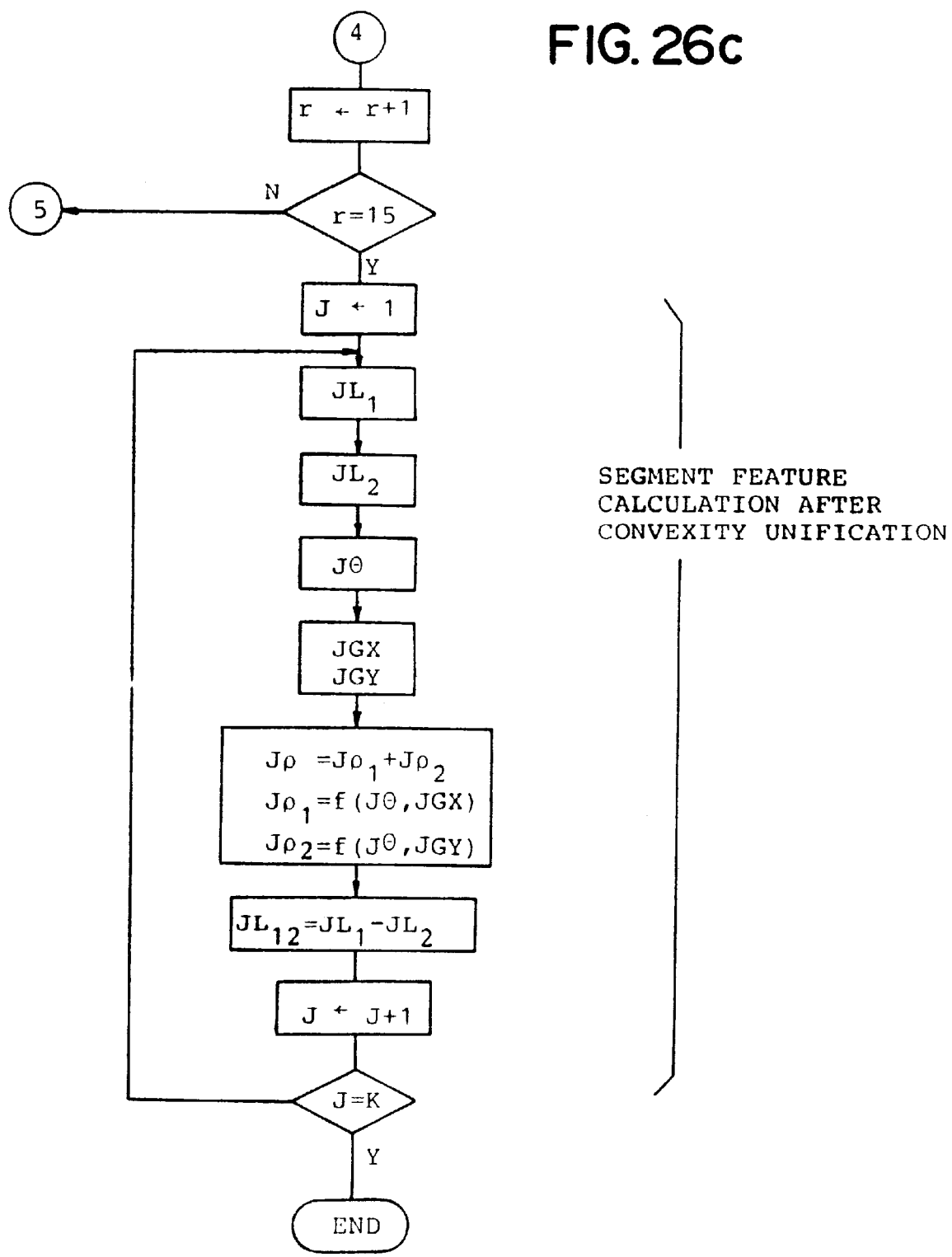

The calculator 31 forming a principal part of the calculating unit 3, can be embodied for example with the circuit construction shown in FIG. 25. Its operation includes the steps of "convex and concave determination of r-direction segment", "inner structure determination of r-direction segment", "unification", and "segment feature calculation after convexity unification", as shown by the flowchart of FIGS. 26a, 26b and 26c. Referring again to FIG. 25, it can be considered that a bus 1 is connected to the input buffer 33 of FIG. 1 and a bus 2 is similarly connected to the output buffer 34. The calculator 31 shown in FIG. 25 includes a microprogram controller CPU (central processing unit) comprising a microprogram controller 320, a microprogram storage ROM 321 and a register and ALU (arithmetic logic unit) 322. The calculator 31 also comprises a high-speed divider 323 for increasing the computing speed of the CPU, ROMs 310, 311, 312 and 313, respectively storing data L1, L2' e., and p1 and P2 which are in the form of mathematical graphs, and a buffer memory 314 for storing input and output data and intermediate results.

The microprogram controller 320 is provided to control the addresses of the ROM 321 which stores therein a program for controlling the respective circuit blocks. The register and ALU 332 comprises a circuit (ALU) for performing both arithmetic and logical operations and a register for temporarily storing the results of computations. The buffer memory 314 is a data buffer for temporarily storing the input data supplied from the preceding stage, the output data to be delivered to the following stage and the intermediate results of the operation being performed. The addresses of the buffer memory 314 are controlled by the buffer address register 315, and there is further provided a multiplexer 316 for selecting and writing either the data from the bus 1 or the data from the bus 2. Numerals 324, 325, 326 and 327 designate input registers each designed to temporarily store a computed numerical value.

The divider 323 divides the dividend stored in the input register 324 by the divisor on the bus 2 and delivers the resulting quotient onto the bus 1.

There is fer provided a constant ROM 317 for delivering the required constant onto the bus 1 during the processing. The ROMs used for detecting the respective features are designed as follows.

The $L_1$ ROM 310 is designed to obtain the value of $rL_1$ from the previously mentioned equation (1) so that in accordance with the following $$rL_1 = SNP_r - (2-\sqrt{2})\, SLPr$$

$$SNP_r = NP(r) - NP(r-1)$$

$$SLPr = LP(r) - LP(r-1)$$

When the value of $SLP_r$ is delivered onto the bus 1, the computation results of $(2-\sqrt{2})$ SLPR is delivered onto the bus 1 and then the value of $rL_1$ is computed.

The $L_2$ ROM 311 is designed so that for the high speed computation of $rL_2$, the equation (2) is modified by DXr=PX(r+1)−PX(r) and DYr=PY(r+1)−PY(r) to obtain $rL_2$=DXr+($\sqrt{2}$−1) DYr when |DXr|>|DYr| and $rL_2$=DYr+($\sqrt{2}$−1)

DXr when $|DXr| \leq |DYr|$, and the value of $-\sqrt{2}-1$) DXr is delivered onto the bus 1 when the value of DYr is delivered onto the bus 2, whereas the value of $(\sqrt{2}-1)$ DXr is delivered onto the bus 1 when the value of DXr is delivered onto the bus 2, thus obtaining from the result the value of $rL_2$.

The θ ROM 312 is designed so that, in order to obtain the value of re, the values of DXr=PX(r)–PX(r–1) and DYr=PY(r)–PY(r–1) are obtained preliminarily and the DXr is set in the input register 325 and the DYr is delivered onto the bus 2, thus delivering the resulting direction θr of the segment onto the bus 1.

The, $\rho_2$, $\rho_2$ ROM is designed so that the value of rρ is obtained in the following manner so as to obtain the value of PC of the equation (8) and the value of Pσ of the equation (9). In other words, $$r\rho = r\rho_1 + r\rho_2$$

where $$r\rho_1 = SGXr \cdot \cos \theta r$$

$$r\rho_2 = SGYr \cdot \sin \theta r$$

$$SGXr = GXr - CXr/2$$

$$SGYr = GYr - CYr/2$$

$$CXr = PXr + PX(r-1)$$

$$CYr = PYr + PY(r-1)$$

$$GXr = SX(r)/(SNPr - SLPr)$$

$$GYr = SY(r)/(SNPr - SLPr)$$

Thus, an output $r\rho_1$ of the ROM 313 is delivered onto the bus 1 when the SGXR is sent into the input register 326 and the θr is delivered onto the bus 2 and an output rρ2 of the ROM 313 is delivered onto the bus 1 when the SGYR is sent into the input register 327 and the θr is delivered onto the bus 2, thus obtaining from the result the value of $r\rho = r\rho_1 + r\rho_2$.

Figure 27:
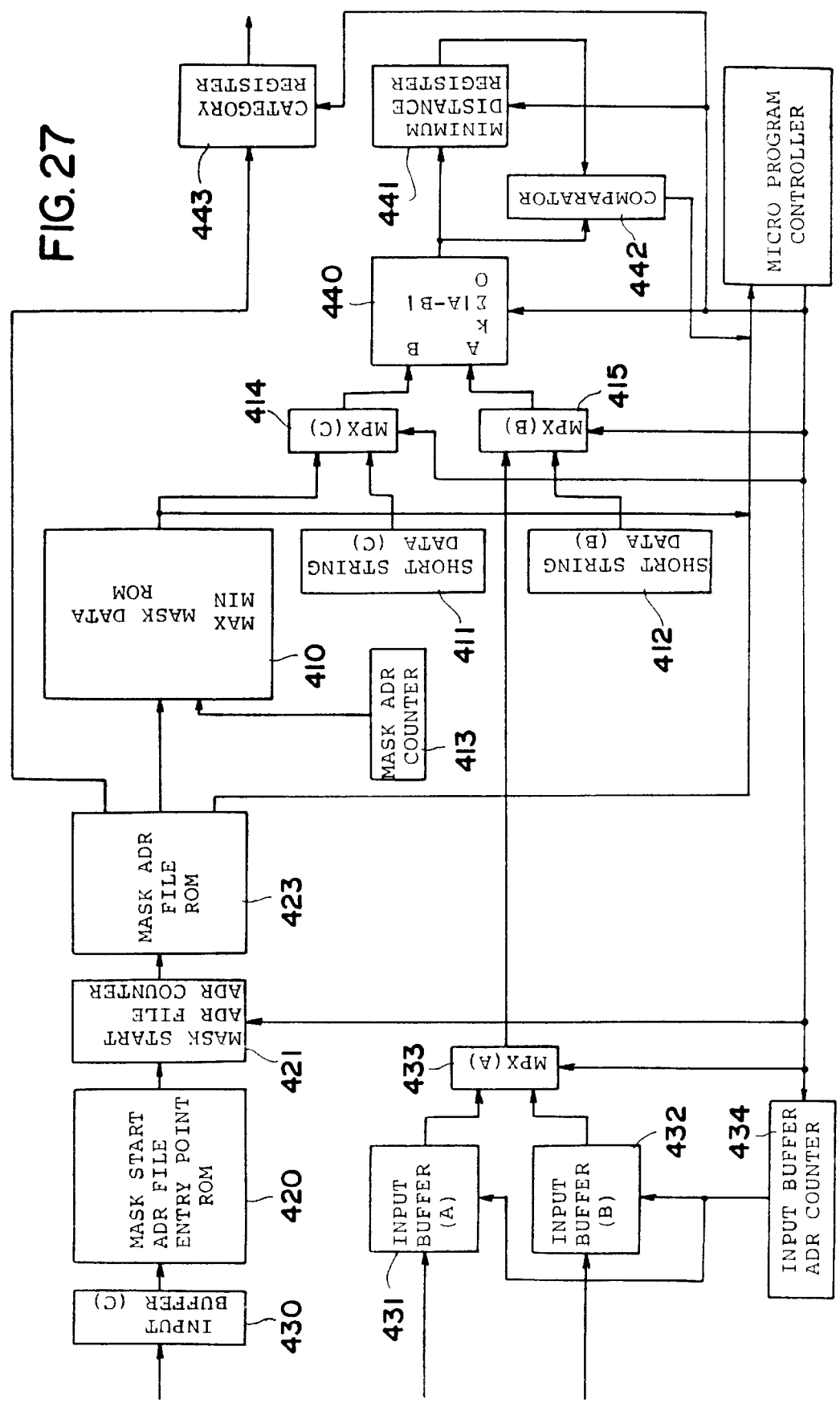
FIG. 27 is a block diagram showing by way of example a specific construction of the matching unit 4.
Figure 29:
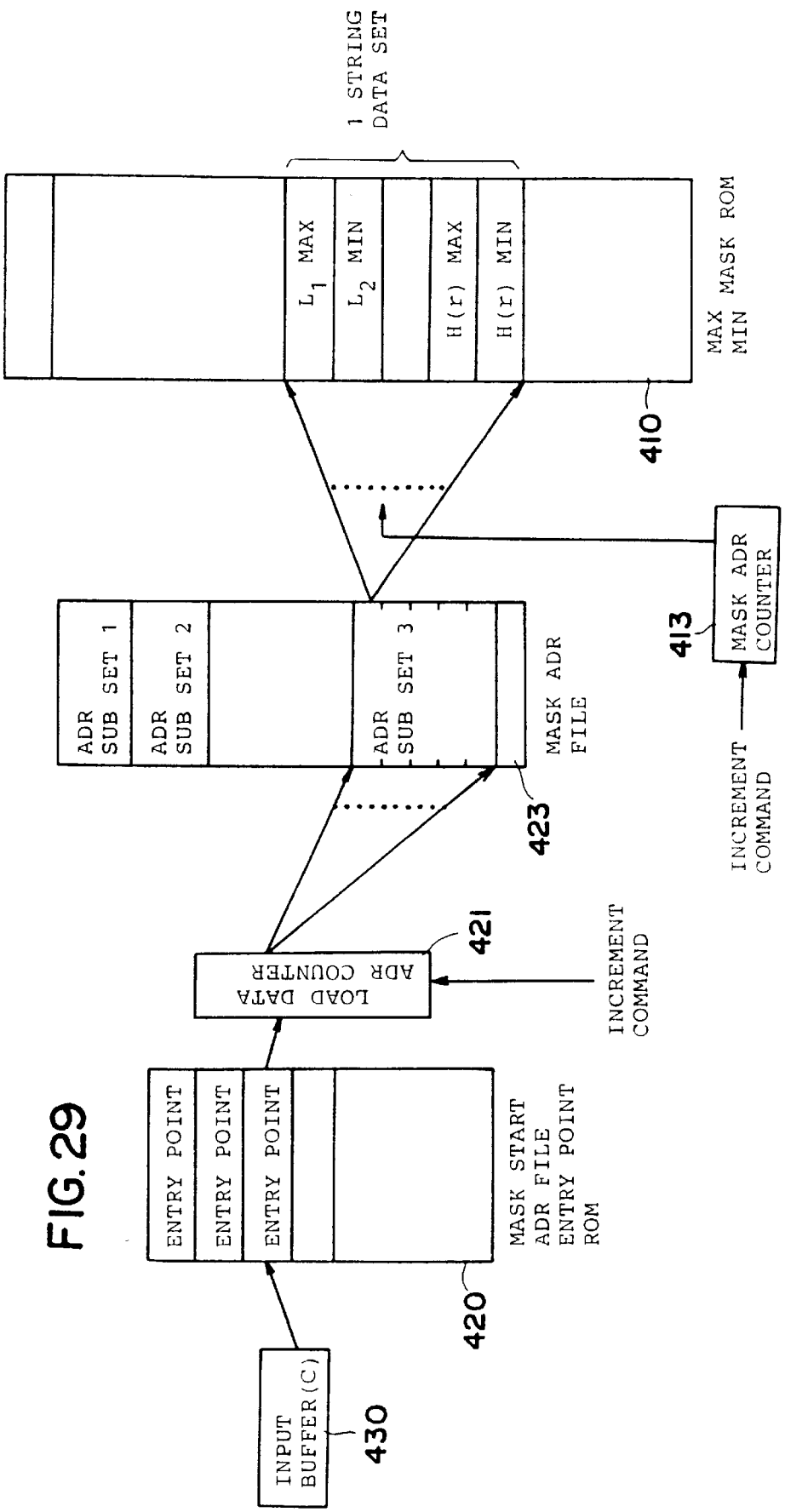
FIG. 29 is a diagram showing the mask access mechanism in the matching unit 4.
Figure 30A:
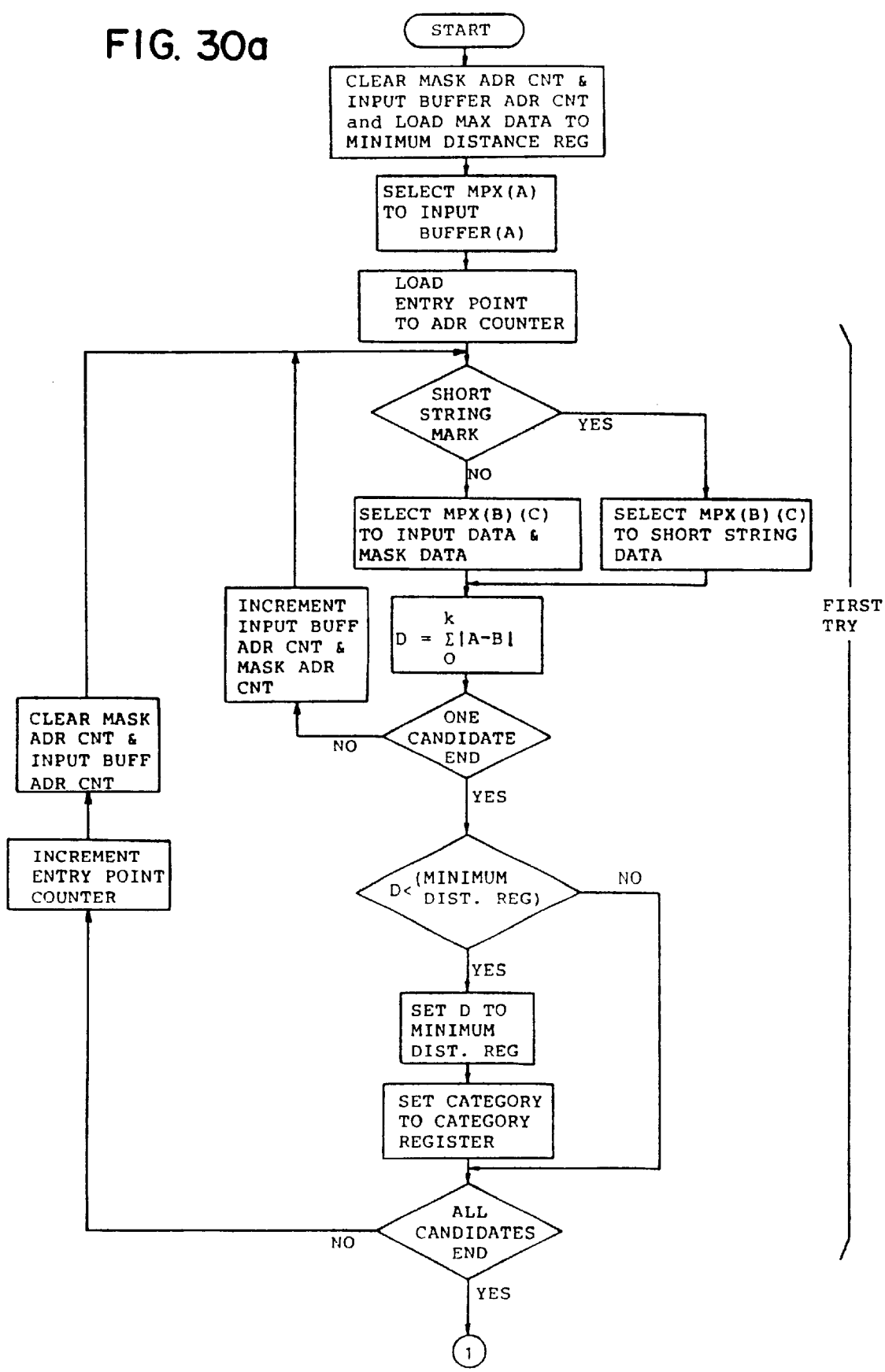
FIGS. 30a and 30b illustrate a specific flow of operations of the matching unit 4.
Figure 30B:
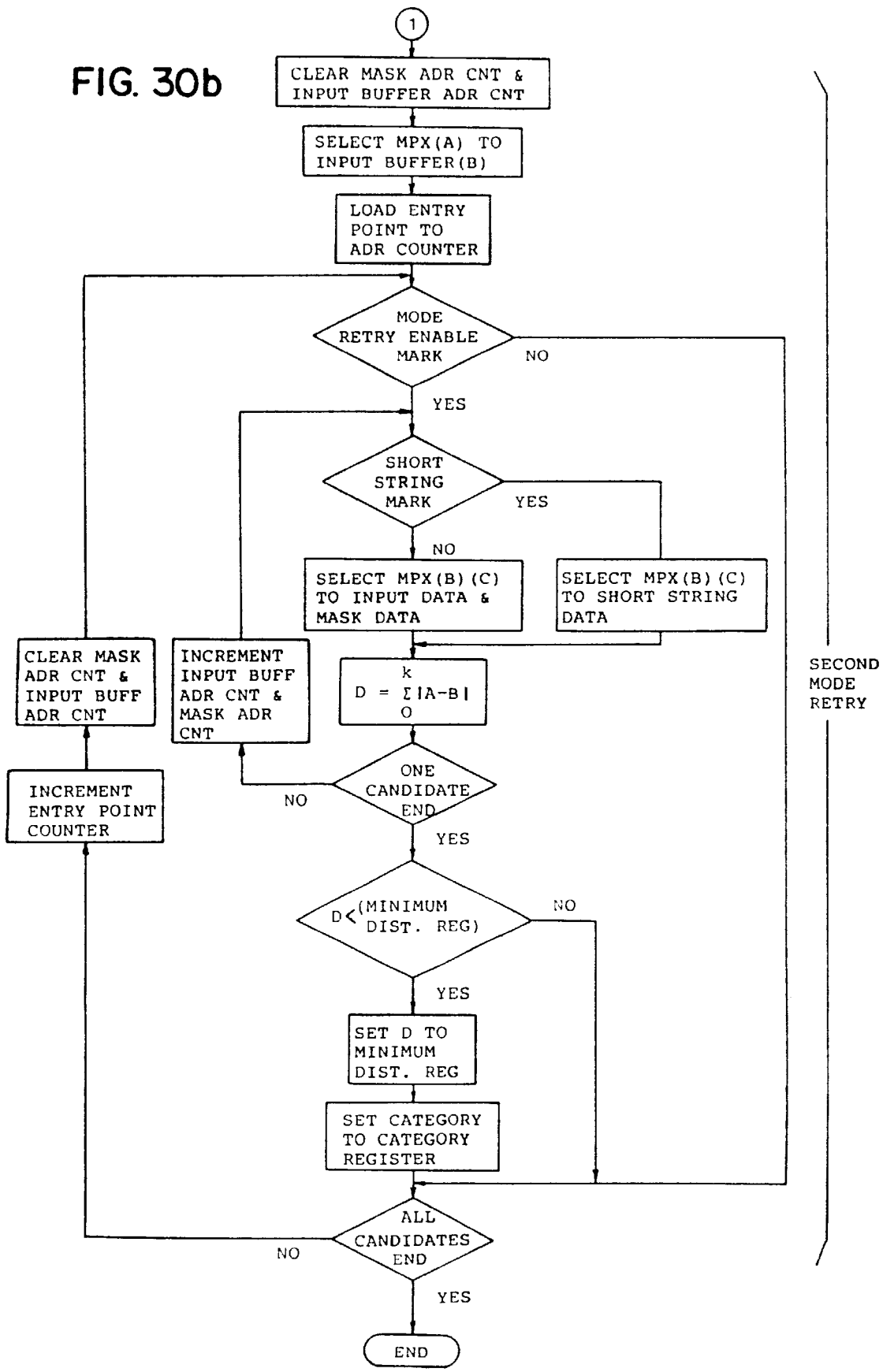

Finally, the matching unit 4 can be embodied as shown in FIG. 27. In the figure, an input buffer 430 receives from the preceding unit 3 those data including the number of segments, the number of discretes, the number of inner loops, etc. All the candidate data for the character to be decided by these received data are stored in a max/min/mask ROM 410 as shown in FIG. 29, and the top address of the respective string data sets in the ROM 410 are specified by the respective subsets of a mask address file 423. The top addresses of these subsets are stored as entry points in a mask start address file entry pont ROM 420. An address counter 421 is controlled by the increment command from a controller 450 so that when any of subsets stored in the ROM 423 is selected by one of the entry points in the ROM, all the contents of the selected subset are accessed. The address data of one of the address subsets stored in the ROM 423, and specified by the counter 421, indicates the location of one of the string data sets in the ROM 410. The feature axis data in this particular data set are accessed by a mask address counter 413.

Another input buffer 431 is a buffer memory into which the data from the first detected concave data to the Kth detected convex data, inclusively are sequentially stored for the purpose of first try as shown in FIG. 28a. Another input buffer 432 is a buffer memory into which data from the third detected concave data to the Kth detected convex data, followed by the first detected concave data and the second detected convex data are sequentially stored in this order for the purpose of mode retry as shown in FIG. 28b. The buffers 431 and 432 are provided to perform the operations described in connection with FIGS. 17a and 17b. The data to be output from each of the buffers 431 and 432 is addressed by an address counter 434. The data from the buffers 431 and 432 are selectively fetched, that is, fetched from the buffer 431 during the first try and fetched from the buffer 432 during the mode retry, and the data selection is effected by a multiplexer 433 under the control of a controller 450.

Numerals 411 and 412 designate dummy data provided for the data marked as short convex segment data and they relate to that which was described in connection with FIGS. 15a and 15b. A multiplexer 414 is provided to select one or the other of the dummy data 411 and the data from the ROM 410, and a multiplexer 415 is provided to select one or the other of the dummy data 412 and the selected data from the multiplexer 433. The outputs of the multiplexers 414 and 415 are applied to an arithmetic logic unit or ALU 440 which in turn sequentially integrates the absolute value |A–B| of the difference between the output A of the multiplexer 415 and the output B of the multiplexer 414. A register 441 is provided to store the minimum value of the integration result $_0\int^k |A-B|$, and a comparator 442 examines whether the stored distance is minimum with respect to the respective candidate categories. These components are all controlled by the controller 450 and thus the matching unit 14 is operated in accordance with the flowchart shown in FIGS. 30a and 30b.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pattern recognition system wherein a contour tracer unit traces the contour of a two-dimensional character pattern of a character scanned by an optical scanner and stored in the form of a binary quantized signal in a two-dimensional memory, comprising:

a first extraction means for extracting the outermost points in a plurality of predetermined directions, said outermost points being determined by extending a predetermined number of rays, in a predetermined set of angular directions, from a common starting point on said contour of said character, until farthest portions of the contour of the character are intersected by said rays at intersections, respectively, said intersections defining said outermost points, respectively;

calculating means including an information extracting means for extracting information from an output signal of said first extraction means and for associating said output signal with a series of contour lines forming said contour, and a segmenting means for segmenting, in the order of tracing of said contour lines, each of said contour lines into one of a convex line segment, a concave line segment, and a hole segment so as to extract feature parameters of each of said contour lines;

matching means for comparing and attempting to match said feature parameters of those of said line segments which are determined not to be convex segments lesser than a predetermined length with a plurality of predetermined feature vectors of a dictionary so as to decide said two-dimensional character pattern.

* * * * *